United States Patent
Kayanaka et al.

(10) Patent No.: US 11,787,174 B2
(45) Date of Patent: Oct. 17, 2023

(54) NON-TRANSITORY COMPUTER-READABLE MEDIUM STORING COMPUTER-READABLE INSTRUCTIONS, PRINT DEVICE, AND PRINT DATA CREATION METHOD

(71) Applicant: BROTHER KOGYO KABUSHIKI KAISHA, Nagoya (JP)

(72) Inventors: Yoshihisa Kayanaka, Kuwana (JP); Shota Morikawa, Nagoya (JP); Takeshi Watanabe, Nagoya (JP); Masashi Ueda, Nagoya (JP); Masashi Okamoto, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 17/212,788

(22) Filed: Mar. 25, 2021

(65) Prior Publication Data
US 2021/0402762 A1    Dec. 30, 2021

(30) Foreign Application Priority Data

Jun. 29, 2020 (JP) .................................. 2020-112164

(51) Int. Cl.
*B41J 2/045* (2006.01)
*G06K 15/10* (2006.01)
*B41J 2/21* (2006.01)

(52) U.S. Cl.
CPC ....... *B41J 2/04586* (2013.01); *B41J 2/04536* (2013.01); *B41J 2/2132* (2013.01); *G06K 15/102* (2013.01)

(58) Field of Classification Search
CPC .. B41J 2/04586; B41J 2/04536; B41J 2/2132; H04N 1/6019; G06K 15/102
See application file for complete search history.

(56) References Cited

U.S. PATENT DOCUMENTS

| | | | |
|---|---|---|---|
| 2010/0214349 A1 | 8/2010 | Ozawa | |
| 2016/0303848 A1 | 10/2016 | Miwa et al. | |
| 2018/0144218 A1* | 5/2018 | Hirano | B41J 2/04 |

FOREIGN PATENT DOCUMENTS

| | | |
|---|---|---|
| JP | 2008-279726 A | 11/2008 |
| JP | 2016-203389 A | 12/2016 |

OTHER PUBLICATIONS

New U.S. patent application concurrently filed Mar. 25, 2021 claiming priority to JP Application No. 2020-112166.

* cited by examiner

*Primary Examiner* — Thinh H Nguyen
(74) *Attorney, Agent, or Firm* — K&L Gates LLP

(57) ABSTRACT

When a print data creation program is executed by a computer, the computer performs the following processing. The computer acquires image data representing a print image from a storage. The computer divides the print image represented by the acquired image data into a plurality of divided images of a desired resolution. The computer creates print data to be printed by a print device, from at least one of the plurality of divided images.

14 Claims, 14 Drawing Sheets

US 11,787,174 B2

NON-TRANSITORY COMPUTER-READABLE MEDIUM STORING COMPUTER-READABLE INSTRUCTIONS, PRINT DEVICE, AND PRINT DATA CREATION METHOD

CROSS-REFERENCE TO RELATED APPLICATION

This application claims priority to Japanese Patent Application No. 2020-112164 filed Jun. 29, 2020. The contents of the foregoing application are hereby incorporated herein by reference.

BACKGROUND

The present disclosure relates to a non-transitory computer-readable medium storing computer-readable instructions, a print device, and a print data creation method.

A print device that creates divided print data, on the basis of original print data, for performing printing of each of sets of a plurality of pixel rows divided into equal sections is known. The print device prints all of the plurality of pixel rows by performing the printing on the basis of the created divided print data.

SUMMARY

The above-described print device performs the printing on the basis of the divided print data for performing the printing of each of the equally divided sets of the plurality of pixel rows. There is thus a problem that a printing time becomes long. Further, when creating print data for printing an image using an ink amount greater than an ink amount when printing an image on the basis of the original print data, there is a problem that a time to create the print data becomes long.

Embodiments of the broad principles derived herein provide a non-transitory computer-readable medium storing computer-readable instructions, a print device, and a print data creation method capable of suppressing a print time from becoming long, and further, capable of suppressing a print data creation time from becoming long, even when dividing a print image and performing printing.

Embodiments provide a non-transitory computer-readable medium storing computer-readable instructions that, when executed by a computer, cause the computer to perform processes including an acquisition step of acquiring, from a storage, image data representing a print image, and a first creation step of dividing the print image represented by the image data acquired by the acquisition step into a plurality of divided images of a desired resolution, and creating print data to be printed by a print device, from at least one of the plurality of divided images.

When the print device performs printing on the basis of print data created by a print data creation program, at least one of the plurality of divided images, which are divided using the desired resolution, is printed. In this case, a print time when performing the printing on the basis of the print data can be suppressed. Further, even when creating the print data that prints an image with a large ink amount that is greater than an ink amount used when printing an original print image, a creation time of the print data can be suppressed.

A print device of the present disclosure includes a processor and a memory configured to store computer-readable instructions that, when executed by the processor, perform processes including: acquisition processing of acquiring, from a storage, image data representing a print image and creation processing of dividing the print image represented by the image data acquired by the acquisition processing into a plurality of divided images of a desired resolution, and creating print data from at least one of the plurality of divided images. The same effects as those described above can be achieved.

A print data creation method of the present disclosure includes an acquisition step of acquiring, from a storage, image data representing a print image, and a creation step of dividing the print image represented by the image data acquired by the acquisition step into a plurality of divided images of a desired resolution, and creating print data to be printed by a print device, from at least one of the plurality of divided images. The same effects as those described above can be achieved.

BRIEF DESCRIPTION OF THE DRAWINGS

Embodiments will be described below in detail with reference to the accompanying drawings in which.

DETAILED DESCRIPTION

Figure 1:
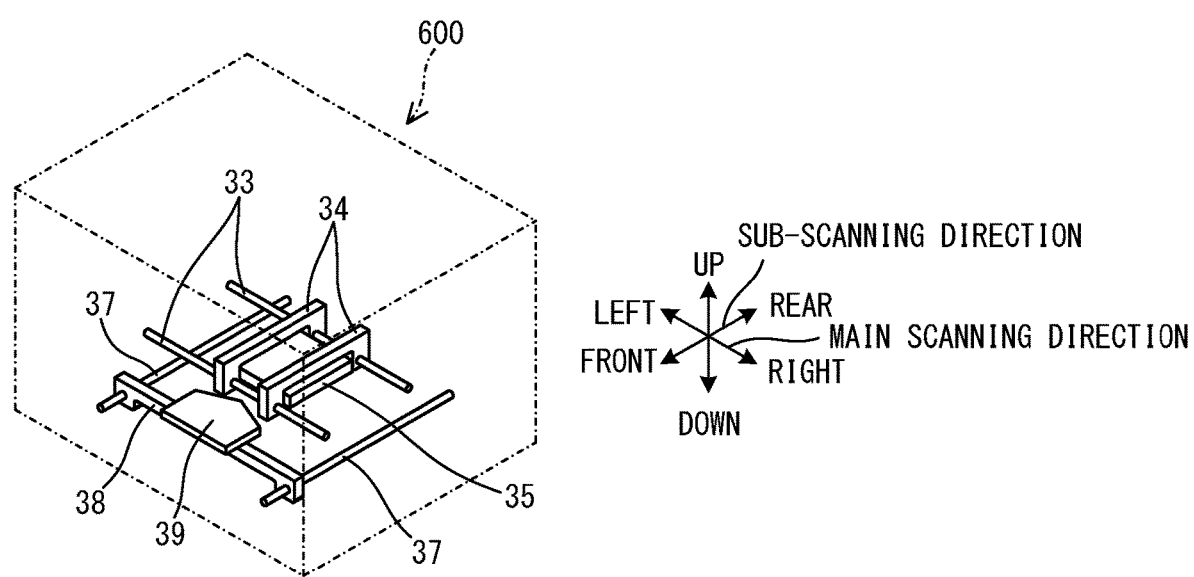
FIG. 1 is a perspective view showing an overall configuration of a print device 600.

A print device 600 shown in FIG. 1 is an inkjet printer, for example, and performs printing by discharging ink onto a recording medium, such as a fabric, paper, or the like. The print device 600 can print a color image on the recording medium using five colors of ink, namely, white (W), black (K), yellow (Y), cyan (C), and magenta (M). The lower left side, the upper right side, the lower right side, the upper left side, the upper side, and the lower side in FIG. 1 are, respectively, a front side, a rear side, a right side, a left side, an upper side, and a lower side of the print device 600.

Hereinafter, of the five color inks, the white ink will be referred to as the white ink, and the four color inks of black, cyan, yellow, and magenta will be referred to collectively as color inks. When the white ink and the color inks are referred to collectively, or no particular distinction is made between the inks, they will be referred to simply as the ink or inks. The white ink is used for printing a background, in order to improve color development of the color inks. The color inks are used for printing a color image by being discharged onto the white ink.

Outline of Print Device 600

The print device 600 is provided with a pair of guide rails 37 that extend in the front-rear direction, at a substantially central portion in the left-right direction. The pair of guide rails 37 support a platen support base 38. A platen 39 is fixed to a substantially central portion, in the left-right direction, of the upper surface of the platen support base 38. A recording medium, such as a T-shirt or the like that is the recording medium, is placed on the upper surface of the platen 39, for example. The platen support base 38 is transported in a sub-scanning direction along the guide rails 37, by a sub-scanning mechanism 210 (refer to FIG. 3) that includes a sub-scanning motor and a belt. In the present embodiment, the sub-scanning direction is the front-rear direction in which the recording medium is transported by the platen 39.

The print device 600 is provided with a pair of guide rails 33 that extend in the left-right direction, in a substantially central portion in the front-rear direction, and above the platen 39. The pair of guide rails 33 support a carriage 34. Eight discharge heads 35 are mounted on a lower portion of the carriage 34. The carriage 34 is transported in a main scanning direction along the guide rails 33, by a main scanning mechanism 220 (refer to FIG. 3) that includes a main scanning motor and a belt. In the present embodiment, the main scanning direction is the left-right direction in which the discharge heads 35 are moved by the carriage 34.

Figure 2:
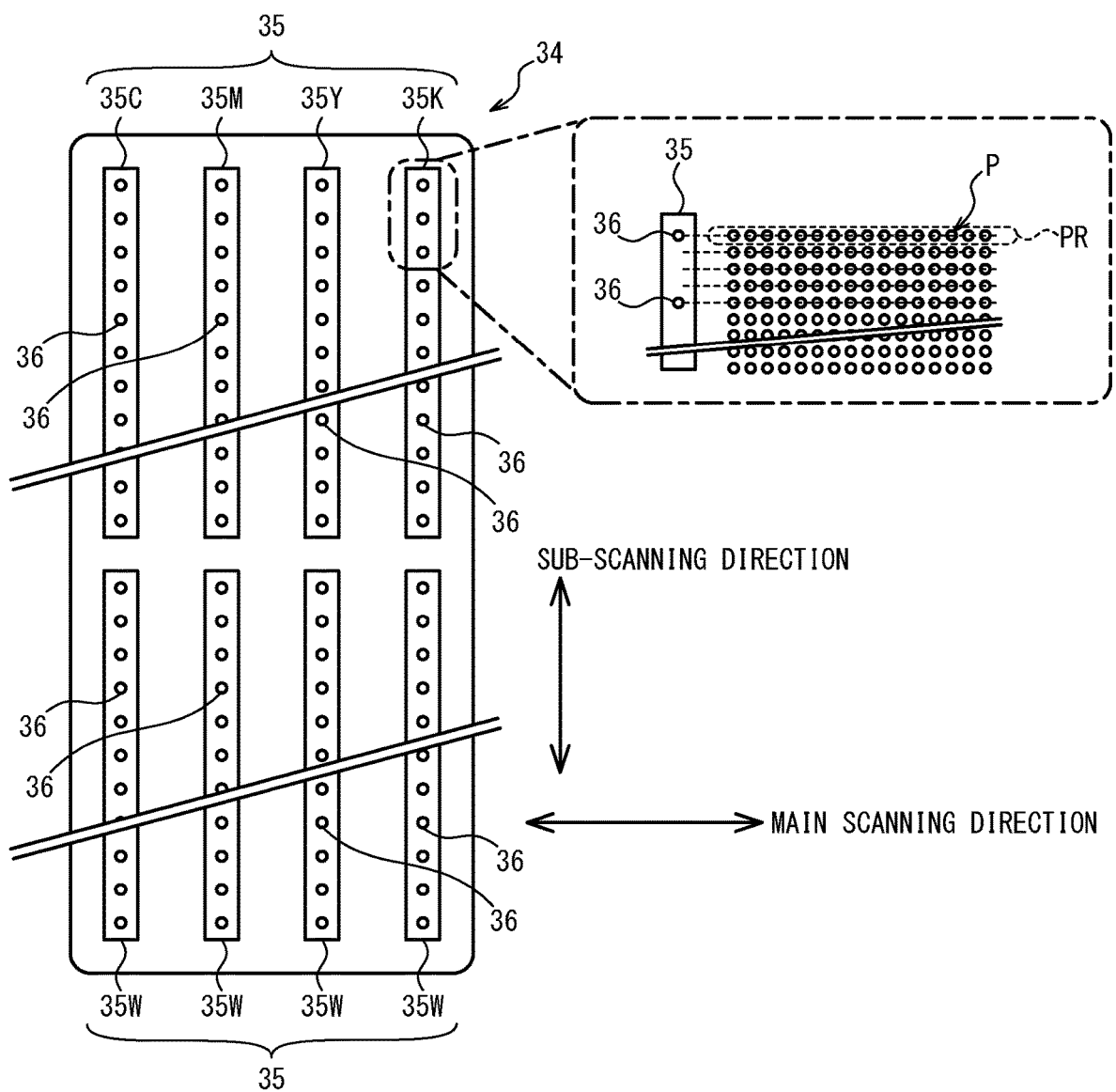
FIG. 2 is a bottom view showing an overall configuration of a carriage 34.

As shown in FIG. 2, the eight discharge heads 35 mounted on the carriage 34 include four discharge heads 35W, and discharge heads 35C, 35M, 35Y, and 35K. 128 discharge ports 36, which are aligned in the sub-scanning direction, are provided in the bottom surface of each of the eight discharge heads 35. The four discharge heads 35W, are separated from the discharge heads 35C, 35M, 35Y, and 35K in the sub-scanning direction. Note that, in FIG. 2, in order to simplify the explanation, the number of discharge ports 36 illustrated is less than the actual number of discharge ports 36. The discharge ports 36 can respectively discharge the inks.

The four discharge heads 35W are aligned in the main scanning direction, and are mounted on the carriage 34. The discharge ports 36 of the four discharge heads 35W discharge the white ink. In a similar manner, the discharge heads 35C, 35M, 35Y, and 35K are also aligned in the main scanning direction and are mounted on the carriage 34. The discharge ports of the discharge heads 35C, 35M, 35Y, and 35K discharge the cyan ink, the magenta ink, the yellow ink, and the black ink, respectively.

The print device 600 forms ink dot rows PR that are aligned in the main scanning direction, by discharging the inks from the discharge heads 35 while causing the carriage 34 to scan in the main scanning direction. When the printing of the dot row PR by a single scan ends, the print device 600 moves the platen 39 in the sub-scanning direction, and once more prints the dot row PR by the single scan. The print device 600 forms a plurality of the dot rows PR on the recording medium by repeatedly performing the above operation in accordance with print data. In this way, a print image is printed, on the recording medium, in which dots P are aligned in the main scanning direction and the sub-scanning direction, respectively. The discharge ports 36 of the discharge heads 35 are disposed at intervals of 4 rows in the lines of the dots P in the sub-scanning direction. As described above, a density per inch in the sub-scanning direction of the dots formed by the inks discharged from the discharge heads 35 is 1200 dpi. Thus, the interval between the discharge ports 36 in the sub-scanning direction is 1/(1200/4) (inches).

The present disclosure can also be applied to a case in which printing is performed in which the discharge heads 35 do not move and the platen 39 moves in the main scanning direction. In other words, it is sufficient that the print device 600 cause the discharge heads 35 and the platen 39 to move relative to each other. Further, the present disclosure can be applied to a case in which the discharge heads 35 are provided with the plurality of discharge ports 36 aligned in the main scanning direction, and the printing is performed without moving the carriage 34 in the main scanning direction.

Electrical Configuration of Print Device 600

Figure 3:
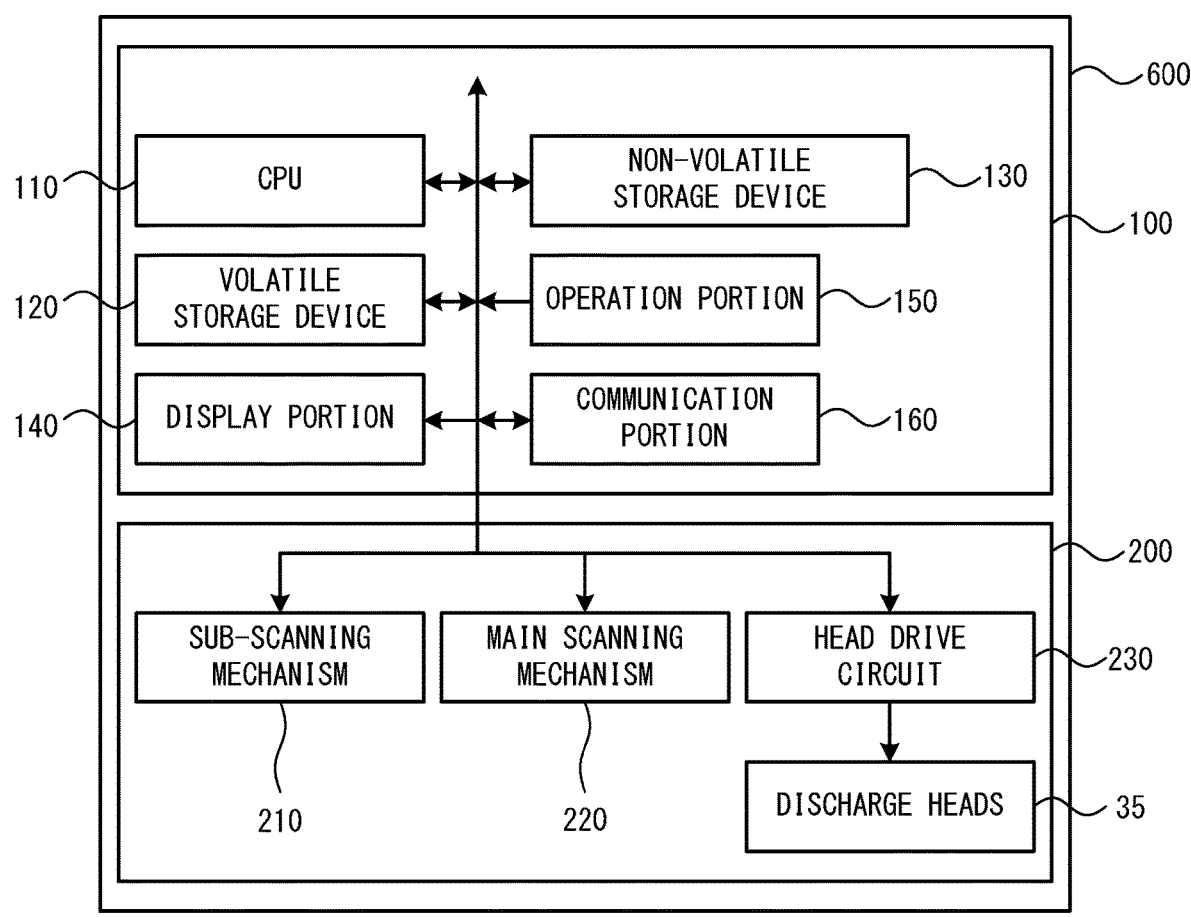
FIG. 3 is a block diagram showing an electrical configuration of the print device 600.

As shown in FIG. 3, the print device 600 is provided with a control device 100 that performs overall control of the print device 600, and a printing mechanism 200 as a printing execution portion.

The control device 100 is provided with a CPU 110 that is a controller, a volatile storage device 120, such as a DRAM or the like, a non-volatile storage device 130, such as a flash memory, a hard disk drive, or the like, a display portion 140, such as a liquid crystal display or the like, an operation portion 150 that includes a touch panel overlaid on the liquid crystal display, buttons, or the like, and a communication portion 160 that includes a communication interface for communication with an external device, such as a personal computer (not shown in the drawings) or the like.

The volatile storage device 120 temporarily stores various intermediate data generated when the CPU 110 performs processing. The non-volatile storage device 130 stores a print data creation program, the print data, image data, and order information. The print data creation program creates the print data and controls the printing mechanism 200, as a result of being executed by the CPU 110. The print data creation program is stored in the non-volatile storage device 130 in advance, before shipment of the print device 600. The print data creation program is supplied in a mode of being stored in a CD-ROM of the like, or in a mode of being downloaded from a server. The CPU 110 executes the print data creation program and performs control processing to be described later (refer to FIG. 5). The print data is data of the print image to be printed using the printing mechanism 200. The order information prescribes an order when printing the print data.

The printing mechanism 200 performs the printing in accordance with the control of the CPU 110, by discharging the cyan ink, the magenta ink, the yellow in, the black ink, and the white ink from the discharge heads 35. The printing mechanism 200 is provided with the sub-scanning mechanism 210, the main scanning mechanism 220, a head drive circuit 230, and the discharge heads 35. The head drive circuit 230 drives the discharge heads 35.

Print Image and Print Data

Print data D11 that prints a background image W11, which is a white print image obtained by discharging the white ink from the four discharge heads 35W, will be explained as an example of the print data. The print data D11 includes information indicating positions at which the dots are to be formed in the background image W11 (hereinafter referred to as "dot positions"), and information indicating positions at which the dots are not to be formed.

Figure 4:
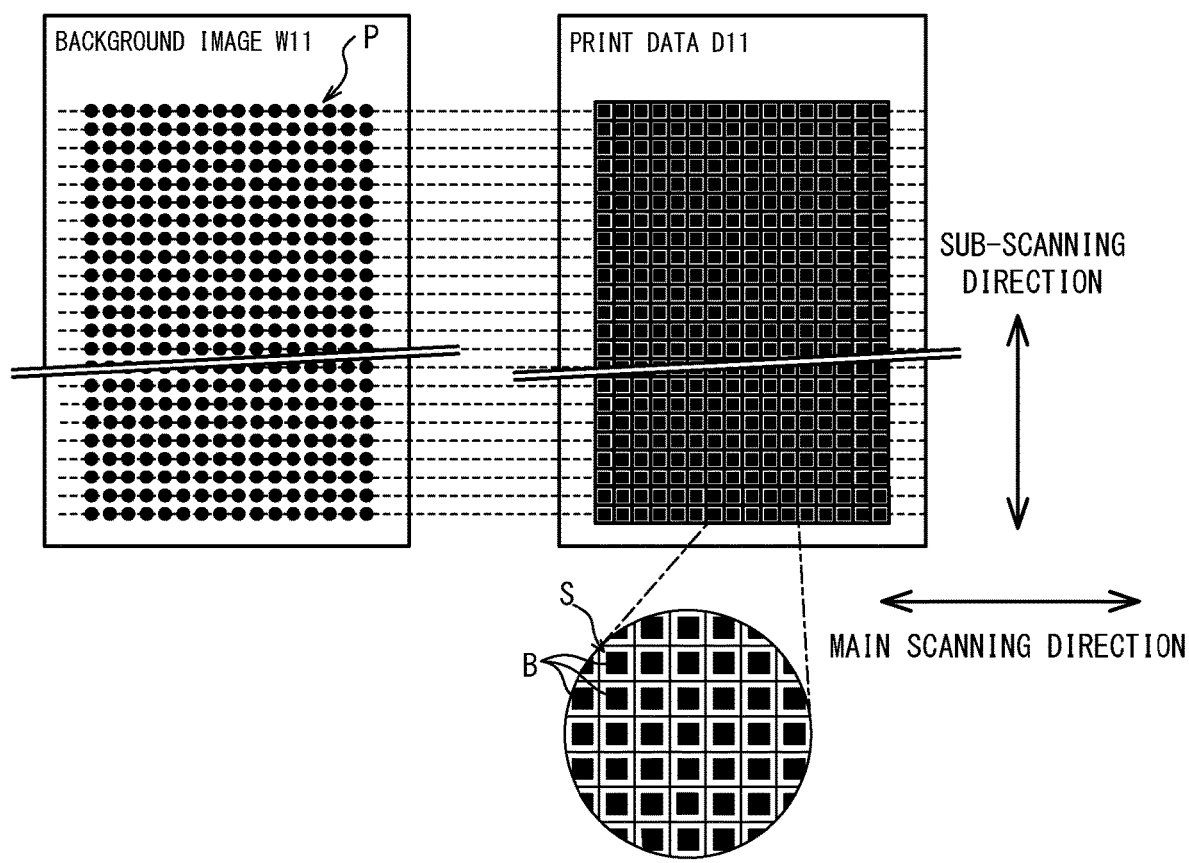
FIG. 4 is a diagram showing a background image W11, and a concept diagram of print data D11.

In FIG. 4, the print data D11 is conceptually illustrated. Of the print data D11, each of a plurality of regions S that are demarcated in a lattice shape indicates all the positions at which the discharge of the ink from the discharge heads 35 is possible. Further, of the plurality of regions S, the positions of the regions S in which square marks B that are colored black are disposed indicate the dot positions. In the print data D11 shown in FIG. 4, the marks B are disposed in all of the plurality of regions S. In this case, in the actual print data D11, information is included in which all the positions at which the discharge of the ink from the discharge heads 35W is possible are set as the dot positions.

When printing is performed using the four discharge heads 35W, and the discharge heads 35C, 35M, 35Y, and 35K, print data common to the four discharge heads 35W, and four sets of print data corresponding to each of the discharge heads 35C, 35M, 35Y, and 35K are created. The CPU 110 performs discharge control of the white ink from the four discharge heads 35W on the basis of the print data common to each of the four discharge heads 35W. In this case, the white ink is discharged from the discharge ports 36 of each of the four discharge heads 35W at the dot positions indicated by the print data. In this way, the dots of the white ink are formed, and the white ink background image is printed on the recording medium. Note that the present disclosure can also be applied to the print device 600 including one to three, or five or more of the discharge heads 35W.

Further, the CPU 110 performs the discharge control of the color inks from the discharge heads 35C, 35M, 35Y, and 35K, on the basis of the four sets of print data corresponding to each of the discharge heads 35C, 35M, 35Y, and 35K. In this case, the color inks are discharged from the discharge ports 36 of each of the discharge heads 35C, 35M, 35Y, and 35K at the dot positions indicated by the print data. In this way, the dots of the color inks are formed in a superimposed manner on the dots of the white ink, and a color image, which is the print image of the color inks, is printed on the recording medium. In other words, the background image of the white ink is used as a base of the color image of the color inks. Note that the white ink for forming the background image is not discharged at positions at which the color inks are not discharged.

As shown in FIG. 2, the four discharge heads 35W that discharge the white ink are separated from the discharge heads 35C, 35M, 35Y, and 35K that discharge the color inks in the sub-scanning direction. When a timing at which the white ink is discharged from the four discharge heads 35W and a timing at which the color inks are discharged from the discharge heads 35C, 35M, 35Y, and 35K match each other, each of positions of the background image printed by the discharge of the white ink and of the color image printed by the discharge of the color inks become displaced in the sub-scanning direction. Therefore, on the basis of the interval, in the sub-scanning direction, between the four discharge heads 35W and the discharge heads 35C, 35M, 35Y, and 35K, on the number of the discharge ports 36, and on the interval between the discharge ports 36, the CPU 110 calculates an offset amount required for the printing in which the color image is superimposed on the background image. The CPU 110 applies the offset amount to the dot positions in the print data of the color image, and corrects the print data. The CPU 110 refers to the corrected print data, and discharges the color inks from the discharge heads 35. In this way, the CPU 110 performs the printing such that the color image is superimposed on the background image.

Overview of Control Processing

When a user performs an operation to input a print command on the operation port 150, the CPU 110 of the control device 100 receives the print command from the operation portion 150. The print command includes at least instructions specifying the print data indicating the print image, instructions specifying a print method, and instructions specifying a standby time. The print method indicates one of a first print method or a second print method. The first print method is a print method when printing is performed on a recording medium of a material (polyester or the like, for example) in which bleeding of the ink is relatively likely. The second print method is a print method when printing is performed on a recording medium of a material (cotton or the like, for example) in which the bleeding of the ink is relatively unlikely. The standby time indicates a time period from when the printing of the background image ends to when the printing of the color image starts.

When the print command is received from the operation portion 150, the CPU 110 executes the print data creation program stored in the non-volatile storage device 130. In this way, the CPU 110 executes the control processing that creates the print data and causes the printing mechanism 200 to perform the printing.

Figure 5:
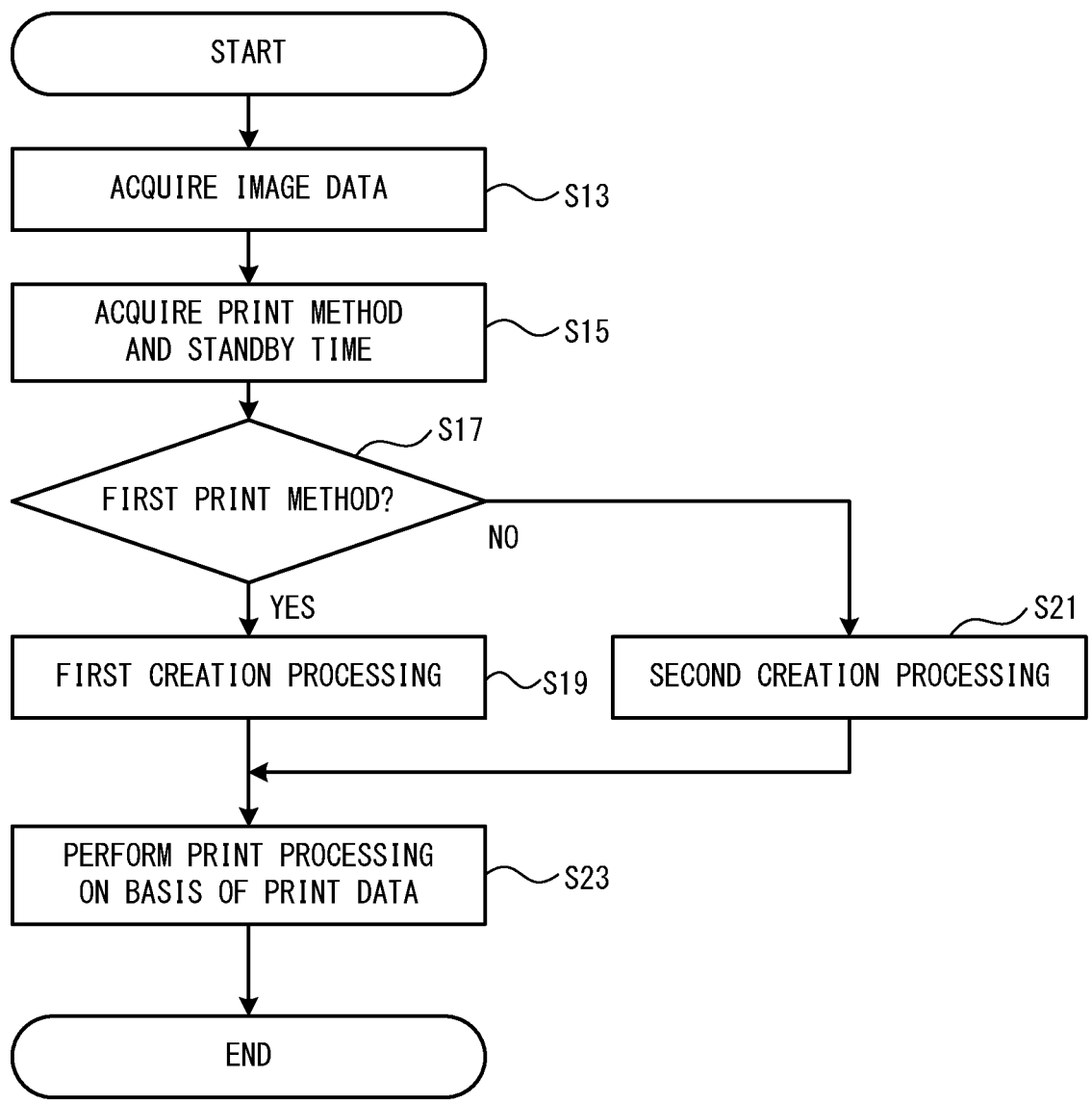
FIG. 5 is a flowchart of control processing.

As shown in FIG. 5, first, the CPU 110 acquires, from the non-volatile storage device 130, the image data specified by the received print command (step S13). Next, the CPU 110 acquires the print method and the standby period specified by the received print command (step S15).

The CPU 110 determines whether the print method specified by the received print command is the first print method (step S17). When the CPU 110 determines that the specified print method is the first print method (yes at step S17), on the basis of the acquired print data, the CPU 110 executes creation processing (first creation processing) that creates the print data using the first print method (step S19). On the other hand, when the CPU 110 determines that the specified print method is the second print method (no at step S17), on the basis of the acquired print data, the CPU 110 executes creation processing (second creation processing) that creates the print data using the second print method (step S21). The first creation processing and the second creating processing will be described in detail later. The CPU 110 controls the printing mechanism 200 on the basis of the print data created by the first creation processing or the second creation processing, and executes print processing (step S23). After ending the print processing, the CPU 110 ends the control processing.

Hereinafter, the print processing executed on the basis of the print data created by the first creation processing will be referred to as "first print processing." The print processing executed on the basis of the print data created by the second creation processing will be referred to as "second print processing." The first creation processing and the first print processing will be collectively referred to as "first processing," and the second creation processing and the second print processing will be collectively referred to as "second processing."

An example of the second processing (step S21, step S23, refer to FIG. 5) will be explained with reference to FIG. 6. Note that, hereinafter, a case is assumed in which the background image W11 shown in FIG. 4 is extracted and used, from the print image represented by the image data acquired by the processing at step S13. Further, in order to simplify the explanation, a case is exemplified in which the print processing is performed by the discharge heads 35W including four of the discharge ports 36, which is a number smaller than the actual number (128) of the discharge ports 36. Furthermore, in FIG. 6, the four discharge heads 35W aligned in the main scanning direction are represented by the single discharge head 35W.

First, in the second creation processing (step S21, refer to FIG. 5), the CPU 110 creates the print data D11 shown in FIG. 4, as the print data that prints the background image W11 using the four discharge heads 35W. Next, the CPU 110 controls the printing mechanism 200 in the following manner, on the basis of the created print data D11, and executes the second print processing (step S23, refer to FIG. 5).

Figure 6:
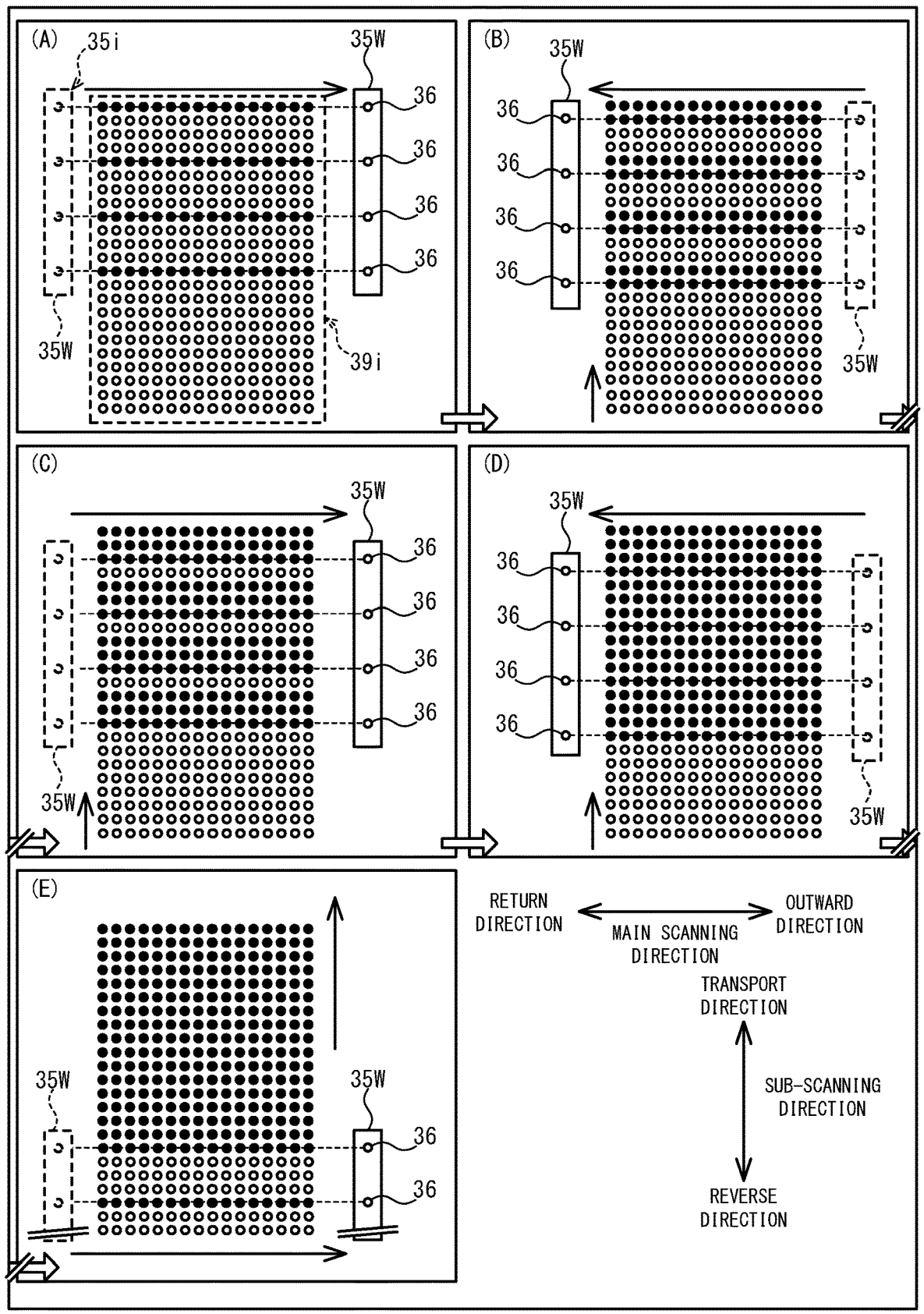
FIG. 6 is an explanatory diagram of a case in which the background image W11 is not divided.

As shown in step (A) of FIG. 6, the CPU 110 transports the carriage 34 (refer to FIG. 2) and moves the four discharge heads 35W in the main scanning direction relative to the platen 39, and disposes the discharge heads 35W in a predetermined head initial position 35i. Further, the CPU 110 moves the platen 39 in the sub-scanning direction relative to the carriage 34, and disposes the platen 39 in a predetermined platen initial position 39i. The CPU 110 discharges the white ink from the discharge ports 36 while moving the four discharge heads 35W in an outward direction that is one side in the main scanning direction. In this way, the CPU 110 forms four of the dot rows, such that the dots are aligned in the main scanning direction and, in the sub-scanning direction, are in four rows (a first row, a fifth row, a ninth row, and a thirteenth row) separated by four dots at a time. At this time, the CPU 110 refers to the dot positions (the first row, the fifth row, the ninth row, and the thirteenth row) of the print data D11 (refer to FIG. 4), and discharges the white ink from the four discharge ports 36 of each of the four discharge heads 35W.

After forming the dot rows in each of the first row, the fifth row, the ninth row, and the thirteenth row, as shown in step (B) of FIG. 6, the CPU 110 moves the platen 39 in a transport direction that is one side in the sub-scanning direction, by an amount corresponding to one dot. The CPU 110 discharges the white ink from the discharge ports 36 while moving the four discharge heads 35W in a return direction that is opposite to the outward direction. In this way, the CPU 110 forms four of the dot rows, such that the dots are aligned in the main scanning direction and, in the sub-scanning direction, are in four rows (a second row, a sixth row, a tenth row, and a fourteenth row) separated by four dots at a time. At this time, the CPU 110 refers to the dot positions (the second row, the sixth row, the tenth row, and the fourteenth row) of the print data D11, and discharges the white ink from the four discharge ports 36 of each of the four discharge heads 35W.

After forming the dot rows in each of the second row, the sixth row, the tenth row, and the fourteenth row, as shown in step (C) of FIG. 6, the CPU 110 moves the platen 39 in the transport direction by the amount corresponding to one dot. The CPU 110 discharges the white ink from the discharge ports 36 while moving the four discharge heads 35W in the outward direction. In this way, the CPU 110 forms four of the dot rows, such that the dots are aligned in the main scanning direction and, in the sub-scanning direction, are in four rows (a third row, a seventh row, an eleventh row, and a fifteenth row) separated by four dots at a time. After forming the dot rows in each of the third row, the seventh row, the eleventh row, and the fifteenth row, as shown in step (D) of FIG. 6, the CPU 110 moves the platen 39 in the transport direction by the amount corresponding to one dot. The CPU 110 discharges the white ink from the discharge ports 36 while moving the four discharge heads 35W in the return direction. In this way, the CPU 110 forms four of the dot rows, such that the dots are aligned in the main scanning direction and, in the sub-scanning direction, are in four rows (a fourth row, an eighth row, a twelfth row, and a sixteenth row) separated by four dots at a time. In this manner, the first row to the sixteenth row are filled in by the 16 dot rows.

Next, as shown in step (E) of FIG. 6, the CPU 110 moves the platen 39 in the transport direction by an amount corresponding to a length of the discharge head 35. The length of the discharge head 35 here corresponds to a length between the first row and the sixteenth row. Note that the platen 39 has already moved by an amount corresponding to three dots in the transport direction, between steps (A) to (D) of FIG. 6. Thus, more specifically, the above-described movement distance of the platen 39 matches a value obtained by subtracting three dots from the length of the discharge heads 35. After that, using the same method used to form the sixteen dot rows of the first row to the sixteenth row, the CPU 110 forms sixteen dot rows of a seventeenth dot row to a thirty-second dot row. After this, the processing is continued until the white ink is discharged to all the dot positions in the print data D11. In this way, the background image W11 is printed on the recording medium.

Note that, although details are omitted here, the CPU 110 extracts a cyan image, a magenta image, a yellow image, and a black image from the print image, and creates the print data that prints each of the extracted images. The CPU 110 controls the printing mechanism 200 on the basis of the created print data. In this way, after the standby time included in the print command has elapsed from when the printing of the background image W11 is complete, the CPU 110 discharges the color inks from the discharge heads 35C, 35M, 35Y, and 35K on the position formed by the white ink dots, and prints the color image on the recording medium. In this way, the background image and the color image are printed in the superimposed manner.

Hereinafter, an ink amount ratio and a dot density will be used as parameters representing a resolution of the print image. The ink amount ratio is a ratio (%) of the amount of ink discharged when the background image is printed. For example, when the background image W11 is printed, the ink amount ratio of the ink discharged from each of the four discharge heads 35W is 100%. In this case, the ink amount ratio of the background image W11 is 400% (100%+100%+100%+100%). The dot density represents a number of dots per inch of the dots formed. For example, when the background image W11 is printed, the dot density is 1200 dpi (sub-scanning direction)×1200 dpi (main scanning direction).

Note that the parameters indicating the resolution of the print image are not limited to the ink amount ratio and the dot density, and, as a parameter indicating the resolution of the print image, another parameter may be used that indicates to what degree of ink density the print image is formed. For example, a total number of dots of the entire print image, a total number of dot rows, a total ink amount (the total number of dots×an ink amount per dot), or the like may be used as the resolution.

Figure 7:
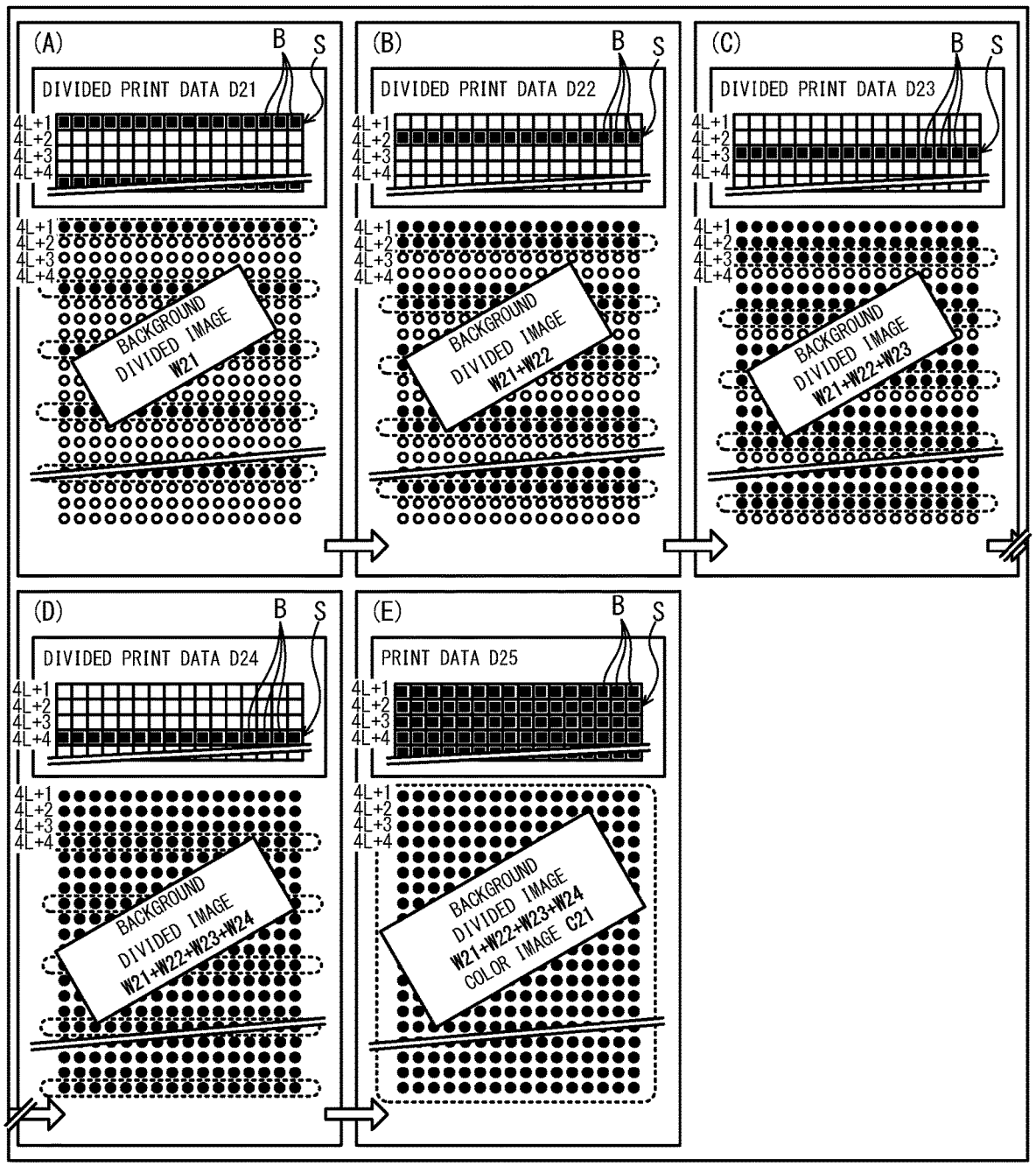
FIG. 7 is an explanatory diagram of a case in which the background image W11 is divided.

Another example of the second processing (step S21, step S23, refer to FIG. 5) will be explained with reference to FIG. 7. In a present example, a case will be explained in which the print data is created that divides the background image W11 into equal sections in the sub-scanning direction and performs the printing. First, in the second creation processing (step S21, refer to FIG. 5), the CPU 110 divides the background image W11 into background divided images W21, W22, W23, and W24, each having an ink amount ratio of 100%. In the background divided image W21, the white ink dot row is formed at a 4L+1-th row (where L is an integer of zero or above). In the background divided image W22, the white ink dot row is formed at a 4L+2-th row. In the background divided image W23, the white ink dot row is formed at t a 4L+3-th row. In the background divided image W24, the white ink dot row is formed at a 4L+4-th row. The dot density of each of the background divided images W21 to W24 is 300 dpi×1200 dpi.

The CPU 110 creates divided print data D21 to D24 from the background divided images W21 to W24. In the divided print data D21, since information is included to set the 4L+1-th row as the dot position, in the concept diagram shown in step (A) of FIG. 7, the mark B is disposed in the region S corresponding to the 4L+1-th row. In the divided print data D22, since information is included to set the 4L+2-th row as the dot position, in the concept diagram shown in step (B) of FIG. 7, the mark B is disposed in the region S corresponding to the 4L+2-th row. In the divided print data D23, since information is included to set the 4L+3-th row as the dot position, in the concept diagram shown in step (C) of FIG. 7, the mark B is disposed in the region S corresponding to the 4L+3-th row. In the divided print data D24, since information is included to set the 4L+4-th row as the dot position, in the concept diagram shown in step (D) of FIG. 7, the mark B is disposed in the region S corresponding to the 4L+4-th row. Furthermore, the CPU 110 creates print data D25 that prints a color image C21. In the print data D25, since information is included to set all of the positions at which the ink from the discharge heads 35C, 35M, 35Y, and 35K can be discharged as the dot positions, in the concept diagram shown in step (E) of FIG. 7, the marks B are disposed in all of the regions S. The dot density of the color image C21 is 1200 dpi×1200 dpi.

Further, the CPU 110 acquires, from the non-volatile storage device 130, the order information indicating the order when performing the printing on the basis of the created divided print data D21 to D24, and the created print data D25. In the present example, in the order information, it is assumed that the divided print data D21 is set to be first in a printing order, the divided print data D22 is set to be second in the printing order, the divided print data D23 is set to be third in the printing order, the divided print data D24 is set to be fourth in the printing order, and the print data D25 is set to be fifth in the printing order. The CPU 110 sets the printing order for the divided print data D21 to D24 and the print data D25. Furthermore, the CPU 110 sets the standby time acquired in the processing at step S15 of the control processing (refer to FIG. 5) in the print data D25.

Next, the CPU 110 controls the printing mechanism 200 in the following manner on the basis of the created divided print data D21 to 24 and the created print data D25, and executes the second print processing (step S23, refer to FIG. 5).

First, the CPU 110 disposes the carriage 34 in the head initial position 35i. Alternatively, the CPU 110 disposes the platen 39 in the platen initial position 39i. The CPU 110 discharges the white ink from the four discharge heads 35W, on the basis of the divided print data D21 that is first in the printing order, while moving the four discharge heads 35W in the main scanning direction. Next, the CPU 110 moves the platen 39 in the transport direction. As a result of the CPU 110 repeating the above-described processing, as shown in step (A) of FIG. 7, the dot row is formed on the 4L+1-th row, and the background divided image W21 is printed on the recording medium. Next, the CPU 110 returns the discharge heads 35 to the head initial position 35i, moves the platen 39 in a reverse direction that is another side in the sub-scanning direction, and returns the platen 39 to a position offset by 1 dot in the transport direction with respect to the platen initial position 39i.

Next, the CPU 110 discharges the white ink from the four discharge heads 35W, on the basis of the divided print data D22 that is second in the printing order, while moving the four discharge heads 35W in the main scanning direction. In this way, as shown in step (B) of FIG. 7, the dot row is formed on the 4L+2-th row, and the background divided image W22 is printed on the recording medium. As a result, a state is obtained in which the background divided images W21 and W22 are printed on the recording medium.

The CPU 110 performs the same operations as those described above on the basis of the divided print data D23 that is third in the printing order and the divided print data D24 that is fourth in the printing order. In this way, as shown in steps (C) and (D) of FIG. 7, the dot rows are formed on the 4L+3-th and 4L+4-th rows, and the background divided images W23 and W24 are printed on the recording medium in order. Note that, before starting the printing on the basis of the divided print data D23, the CPU 110 disposes the platen 39 in a position offset by 2 dots in the transport direction with respect to the platen initial position 39i. Further, before starting the printing on the basis of the divided print data D24, the CPU 110 disposes the platen 39 in a position offset by 3 dots in the transport direction with respect to the platen initial position 39i. Thus, as shown in step (D) of FIG. 7, a state is obtained in which the background divided images W21 to W24 are printed on the recording medium.

Note that the ink amount ratio of each of the background divided images W21 to W24 is 100%. Thus, in the state in which all the images W21 to W24 are printed, the ink amount ratio is 400% (100%+100%+100%+100%). As a result, the ink amount ratio is the same as the ink amount ratio of the undivided background image W11 (refer to FIG. 4). Further, the positions of the dots formed in each of the background divided images W21 to W24 are mutually different. As a result, the dot density in the state in which all the images W21 to W24 are printed is also the same as the dot density of the undivided background image W11 (refer to FIG. 4).

Next, before starting the printing on the basis of the print data D25, the CPU 110 returns the discharge heads 35 to the head initial position 35i, and returns the platen 39 to the platen initial position 39i. After the printing of the background divided image W24 is complete, the CPU 110 stands by for an amount of time corresponding to the standby time set in the print data D25 that is fifth in the printing order. After that, the CPU 110 discharges the color ink from the discharge heads 35C, 35M, 35Y, and 35K on the basis of the print data D25, while moving the discharge heads 35C, 35M, 35Y, and 35K in the main scanning direction. In this way, as shown in step (E) of FIG. 7, the color image C21 is printed on the recording medium so as to be superimposed on the background divided images W21 to W24.

Note that, in the second processing, a command specifying whether to perform the printing in which the background image W11 is not divided (refer to FIG. 6), or to perform the printing in which the background image W11 is divided (refer to FIG. 7) can be included in the print method received by the processing at step S15 of the control processing (refer to FIG. 5). In this case, the CPU 110 determines which of the second processing to perform, on the basis of the command included in the received print command.

FIRST WORKING EXAMPLE

Figure 8:
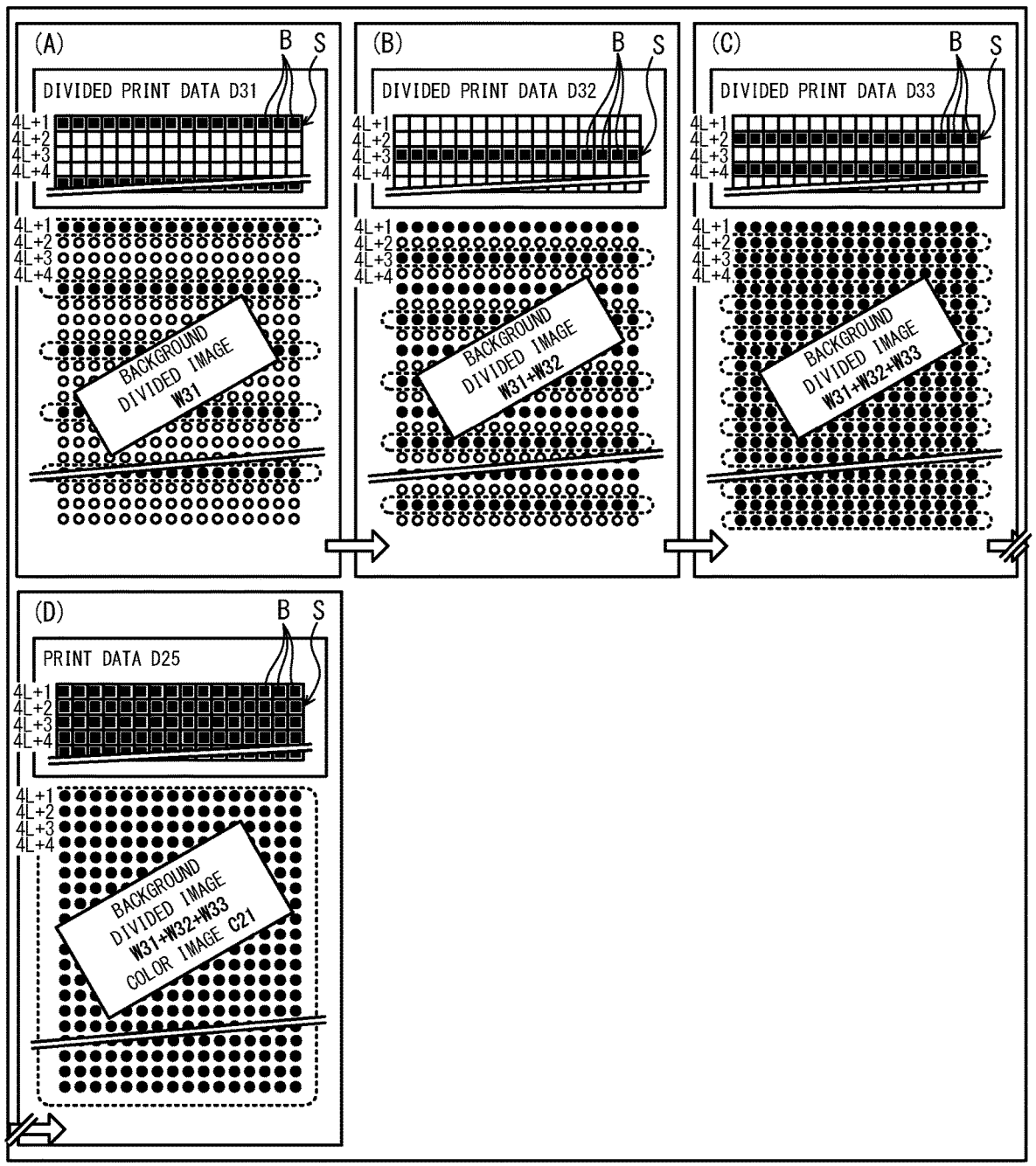
FIG. 8 is an explanatory diagram of a first working example.

A first working example, which is an example of the first processing (step S19, step S23, refer to FIG. 5) will be explained with reference to FIG. 8. The first working example differs from the second processing in that print data is created without dividing the background image W11 into the equal sections. Hereinafter, a description of processing that is the same as that of the second processing will be simplified.

First, in the first creation processing (step S19, refer to FIG. 5), the CPU 110 divides the background image W11 shown in FIG. 4 into background divided images W31 and W32 having an ink amount ratio of 100%, and a background divided image W33 having an ink amount ratio of 200%. As shown in FIG. 8, in the background divided image W31, the white ink dot row is formed on the 4L+1-th row. In the second background divided image W32, the dot row is formed on the 4L+3-th row. In the background divided image W33, the dot rows are formed on the 4L+2-th and 4L+4-th dot rows. The dot density of each of the background divided images W31 and W32 is 300 dpi×1200 dpi. The dot density of the background divided image W33 is 600 dpi× 1200 dpi.

The CPU 110 creates divided print data D31 to D33 from the background divided images W31 to W33. Since the information setting the 4L+1-th row as the dot positions is included in the divided print data D31, in the conceptual diagram shown in step (A) of FIG. 8, the marks B are disposed in the regions S corresponding to the 4L+1-th row. Since the information setting the 4L+3-th row as the dot positions is included in the divided print data D32, in the conceptual diagram shown in step (B) of FIG. 8, the marks B are disposed in the regions S corresponding to the 4L+3-th row. Since the information setting the 4L+2-th row and the 4L+4-th row as the dot positions is included in the divided print data D33, in the conceptual diagram illustrated in step (C) of FIG. 8, the marks B are disposed in the regions S corresponding to the 4L+2-th row and the 4L+4-th row. Note that the divided print data D31 to D33 used in the printing are examples of "print data" of the present disclosure. Further, the CPU 110 creates the print data D25 (refer to step (D) of FIG. 8) to print the color image C21. The color image C21 and the print data D25 are the same as in the case of the second processing. Furthermore, the CPU 110 acquires, from the non-volatile storage device 130, the order information indicating the order of printing on the basis of the created divided print data D31 to D33 and the created print data D25. In the first working example, in the order information, it is assumed that the divided print data D31 is set to be first in the printing order, the divided print data D32 is set to be second in the printing order, the divided print data D33 is set to be third in the printing order, and the print data D25 is set to be fourth in the printing order. The CPU 110 sets the printing order for the divided print data D31 to D33 and the print data D25. Furthermore, the CPU 110 sets the standby time acquired in the processing at step S15 of the control processing (refer to FIG. 5) in the print data D25.

Next, the CPU 110 controls the printing mechanism 200 on the basis of the created divided print data D31 to D33 and the created print data D25, and performs the first print processing (step S23, refer to FIG. 5).

First, the CPU 110 discharges the white ink from the four discharge heads 35W on the basis of the divided print data D31 that is first in the printing order, while moving the four discharge heads 35W in the main scanning direction. Next, the CPU 110 moves the platen 39 in the transport direction. As a result of the CPU 110 repeating the above-described processing, as shown in step (A) of FIG. 8, the dot row is formed on the 4L+1-th row. Next, the CPU 110 discharges the white ink from the four discharge heads 35 on the basis of the divided print data D32 that is second in the printing order, while moving the four discharge heads 35W in the main scanning direction. Next, the CPU 110 moves the platen 39 in the transport direction. As a result of the CPU 110 repeating the above-described processing, as shown in step (B) of FIG. 8, the dot row is formed on the 4L+3-th row. As a result, a state is obtained in which the background divided images W31 and W32 are printed on the recording medium. Next, the CPU 110 discharges the white ink from the four discharge heads 35 on the basis of the divided print data D33 that is third in the printing order, while moving the four discharge heads 35W in the main scanning direction. Next, the CPU 110 moves the platen 39 in the transport direction. As a result of the CPU 110 repeating the above-described processing, as shown in step (C) of FIG. 8, the dot row is formed on the 4L+2-th row and the 4L+4-th row. As a result, a state is obtained in which the background divided images W31 to W33 are printed on the recording medium.

Note that the ink amount ratio of each of the background divided images W31 and W32 is 100%, and the ink amount ratio of the background divided image W33 is 200%. Thus, in the state in which all the images W31 to W33 are printed, the ink amount ratio is 400% (100%+100%+200%), and the ink amount ratio is the same as the ink amount ratio of the undivided background image W11 (refer to FIG. 4). Further, the positions of the dots formed in each of the background divided images W31 to W33 are mutually different. As a result, the dot density in the state in which all the images W31 to W33 are printed is also the same as the dot density of the undivided background image W11 (refer to FIG. 4), that is, 1200 dpi×1200 dpi.

Next, after the printing of the background divided image W33 is complete, the CPU 110 stands by for an amount of time corresponding to the standby time set in the print data D25. After that, the CPU 110 discharges the color ink from the discharge heads 35C, 35M, 35Y, and 35K on the basis of the print data D25 that is fourth in the printing order, while moving the discharge heads 35C, 35M, 35Y, and 35K in the main scanning direction. In this way, as shown in step (D) of FIG. 8, the color image C21 is printed on the recording medium so as to be superimposed on the background divided images W31 to W33.

Actions and Effects of First Working Example

The CPU 110 divides the background image W11 into the background divided images W31 and W32 (with the ink amount ratio of 100%), and the background divided image W33 (with the ink amount ratio of 200%) that has the higher ink amount ratio than the background divided images W31 and W32. The CPU 110 creates the divided print data D31 to D33 from the background divided images W31 to W33. In this case, the background image W11 is divided into a smaller number of sections than the case of the second processing when the background image W11 is divided into the equal sections having the ink amount ratio of 100% (refer to FIG. 7). Thus, the print device 600 can cause the number of the background divided images W31 to W33 to be printed to be smaller than in the case of the background divided images W21 to W24 (refer to FIG. 7) of the second processing. Thus, a printing time of the background image W11 can be shortened.

The CPU 110 creates the divided print data D31 to D33 from all of the background divided images W31 to W33 by which the background image W11 is divided, and prints all of the background divided images W31 to W33. Thus, the ink amount ratio when printing the background divided images W31 to W33 matches the ink amount ratio when printing the background image W11. In this case, the ink amount of the white ink used for printing the divided image W11, and the ink amount of the white ink used for printing the background divided images W31 to W33 are substantially the same. Thus, the print device 600 can print the background divided images W31 to W33 under color development conditions that are substantially the same as for the background image W11, while reducing the printing time.

The CPU 110 divides the background image W11 into the two background divided images W31 and W32 having the ink amount ratio of 100% obtained by dividing the ink amount ratio of 400% of the background image W11 into four equal divisions, and the one background divided image W33 having the ink amount ratio of 200% obtained by doubling the ink amount ratio of 100%. Here, the ink amount ratio of the background image W11 is denoted by D, the number of the background divided images W31 and W32 is denoted by n, and the number of the background divided images W33 is denoted by m. In this case, the ink amount ratio of 100% of the background divided images W31 and W32 can be generalized as D/N where D is divided by N (N=4). Further, the ink amount ratio of 200% of the background divided image W33 can be generalized as (D−(D× n/N))/m. Here, n+m, which is the number obtained by adding together the background divided images W31 to W33, is smaller than N (n+m<N). Therefore, when printing the n number of background divided images W31 and W32 having the ink amount ratio of D/N, and the m number of background divided images W33 having the ink amount ratio of (D−(D×n/N))/m, compared to when printing the N number of background divided images having the ink amount ratio of D/N, the printing time can be reduced, since the total number of background divided images to be printed can be reduced. Further, the print device 600 can print the background image W11 with a picture quality between a picture quality obtained when the background divided images having the ink amount ratio of D/N are printed, and a picture quality obtained when the background divided images having the ink amount ratio that is twice or more that of the ink amount ratio D/N are printed.

The CPU 110 switches between performing the first processing and the second processing on the basis of the print method specified by the print command received from the operation portion 150. When the printing is to be performed on the recording medium of a material such as polyester, for example, the discharged ink easily bleeds through, and there is a significant possibility that a color development performance will deteriorate. In this case, the user specifies the first processing, for example, in order to reduce the printing time while suppressing the deterioration in the color development performance of the ink. In the first processing, since the background image W11 is divided and printed, after a drying time of the background divided image that is printed first, another of the background divided images is printed, and thus, the printing time can be reduced while suppressing the deterioration in the color development performance of the ink. On the other hand, when the printing is to be performed on the recording medium of a material such as cotton, for example, a degree to which the discharged ink bleeds through is smaller than in the case of the recording medium of the material such as polyester. In this case, the user specifies the print processing, in the second processing, in which the background image W11 is not divided. In this case, since the background image W11 is printed as it is without being divided, the time required to print the background image W11 through the discharge of the white ink can be reduced. As described above, the print device 600 performs the printing on the basis of the print method specified by the user in accordance with characteristics of the recording medium.

In the second processing, the CPU 110 may create the divided print data from at least one of the background divided images W21 to W24. In the first working example, the CPU 110 may create the divided print data from at least one of the background divided images W31 to W33. For example, the CPU 110 may create the divided print data D31 and D33 from the background divided images W31 and W33, and need not necessarily create the divided print data D32 from the background divided image W32. Alternatively, the CPU 110 may create the divided print data D31 to D33 from the background divided images W31 to W33 and may perform the printing using only the divided print data D31 and D33. In the first working example, the number of the background divided images W31 to W33, the respective ink amount ratios thereof, and a combination of the ink amount ratios are not limited to the above-described embodiment. For example, the respective ink amount ratios of the background divided images W31 to W33 may be mutually different.

For example, the CPU 110 may divide the ink amount ratio D of the background image by a desired number N. The CPU 110 may perform the division into the background divided images having three or more different ink amount ratios obtained by integral multiplication of the ink amount ratio D/N. Further, there may be one or there may be a plurality of the background divided images of each of the ink amount ratios. For example, the CPU 110 may include a number n(1) of the background divided images obtained by multiplying the ink amount ratio D/N by z(1), a number n(2) of the background divided images obtained by multiplying the ink amount ratio D/N by z(2), and number n(3) of the background divided images obtained by multiplying the ink amount ratio D/N by z(3). Note that, in this case, the following relationships are satisfied: D/N×z(1)×n(1)+D/N× z(2)×n(2)+D/N×z(3)×n(3)=D, and n(1)+n(2)+n(3)<N.

Furthermore, the CPU 110 may generate a plurality of the background images having desired ink amount ratios smaller than the ink amount ratio D, from the background image having the ink amount ratio D, and may create the divided print data from each of the plurality of background images. For example, the CPU 110 may include a number z(1) of the background divided images having an ink amount ratio D' smaller than the ink amount ratio D, a number z(2) of the background divided images having an ink amount ratio D" smaller than the ink amount ratio D, and a number z(3) of the background divided images having an ink amount ratio D''' smaller than the ink amount ratio D. Note that, in this case, the following relationship is satisfied: D'×z(1)+D"×z (s)+D'''×z(3)=D. Moreover, the CPU 110 may perform the printing using only some of the created plurality of divided print data.

The print device 600 may include a camera that captures an image of the recording medium. The CPU 110 may identify the type of the recording medium on the basis of a captured image of the recording medium obtained by the image capture by the camera. For example, identification information (a tag attached to the recording medium, for example) indicating the type may be attached to the recording medium. The CPU 110 may identify the type of the recording medium from the identification information included in the captured image of the recording medium. The CPU 110 may determine whether to create the print data using the first creation processing or create the print data using the second creation processing, in accordance with the identified type of the recording medium.

SECOND WORKING EXAMPLE

A second working example, which is an example of the first processing (step S19, step S23, refer to FIG. 5) will be explained with reference to FIG. 9. The second working example differs from the first working example in that the print data is created in which only one of the background divided images obtained by dividing the background image W11 is superimposed. Hereinafter, an explanation of processing that is the same as that of the first working example will be simplified.

Figure 9:
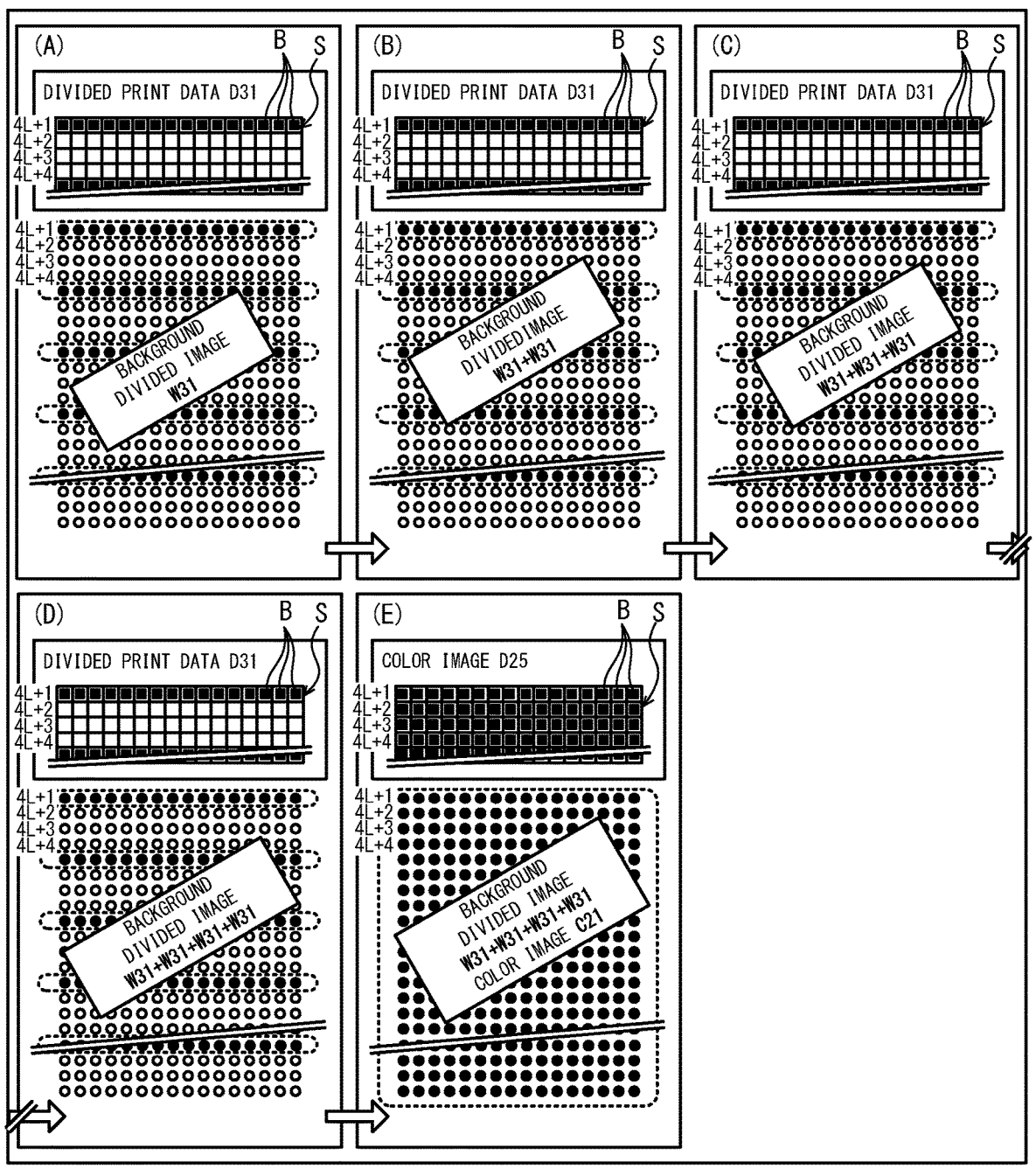
FIG. 9 is an explanatory diagram of a second working example.

In the first creation processing (step S19, refer to FIG. 5), of the background divided images W31 to W33 divided using the same method as that of the first working example (refer to FIG. 8), the CPU 110 creates the divided print data D31 (refer to step (A) of FIG. 9 to step (D) of FIG. 9) from the background divided image W31 only. Note that the divided print data D31 used in the printing is an example of the "print data" of the present disclosure. Note also that the divided print data may be created from only one of any of the background divided images W21 to S24 divided using the same method as that of the second processing (refer to FIG. 7). Further, the CPU 110 creates the print data D25 (refer to step (E) of FIG. 9) that prints the color image C21. The color image C21 and the print data D25 are the same as in the case of the second processing (refer to FIG. 6 and FIG. 7) and the case of the first working example (refer to FIG. 8). Furthermore, the CPU 110 acquires, from the nonvolatile storage device 130, the order information indicating the order when performing the printing on the basis of the created divided print data D31 and the created print data D25. Note that, in the second working example, the background divided image W31 based on the print data D31 is printed four times in a superimposed manner. Thus, in the order information, the divided print data D31 is set to be first to fourth in the printing order, and the print data D25 is set to be fifth in the printing order. The CPU 110 sets the printing order for the divided print data D31 and the print data D25. Furthermore, the CPU 110 sets the standby time acquired in the processing at step S15 of the control processing (refer to FIG. 5) in the print data D25.

Next, the CPU 110 controls the printing mechanism 200 in the following manner on the basis of the created divided print data D31 and the created print data D25, and performs the first print processing (step S23, refer to FIG. 5). The CPU 110 discharges the white ink from the four discharge heads 35W on the basis of the divided print data D31 that is first in the printing order, while moving the four discharge heads 35W in the main scanning direction. Next, the CPU 110 moves the platen 39 in the transport direction. As a result of the CPU 110 repeatedly performing the above-described operation, as shown in step (A) of FIG. 9, the dot row is formed on the 4L+1-th row. Next, the CPU 110 returns the discharge heads 35 to the head initial position 35i and moves the platen 39 in the reverse direction. The CPU 110 performs the above-described operations three times on the basis of the divided print data D31 that are second to fourth in the printing order. In this way, as shown in steps (B) to (D) of FIG. 9, the dots are formed on the 4L+1-th row in a superimposed manner. As a result, as shown in step (D) of FIG. 9, a state is obtained in which the background divided image W31 is formed four times in the superimposed manner on the recording medium. Next, after the printing four times of the background divided image W31 is complete, the CPU 110 stands by for the amount of time corresponding to the standby time set in the print data D25. After that, as shown in step (E) of FIG. 9, the CPU 110 further prints the color image C21 in a superimposed manner on the background divided image W31 that has been printed four times in the superimposed manner.

Note that the ink amount ratio of the background divided image W31 is 100%, and the background divided image W31 is printed four times in the superimposed manner. In this case, the ink amount ratio is 400% (100%+100%+100%+100%), and the ink amount ratio is the same as that of the undivided background image W11 (refer to FIG. 4). In steps (A) to (D) of FIG. 9, the illustration is made in which the dot row is formed only on the 4L+1-th row, and the dot rows are not formed on the 4L+2-th row to 4L+4-th row. However, the size of the dots formed in actuality is larger than the size illustrated. Thus, the 4L+2-th row to the 4L+4-th row are filled in by the dots formed in the 4L+1-th row. Thus, in the 4L+1-th row, a gap where the white ink is not discharged does not occur. On the other hand, respective positions of the dots of the background divided image W31 printed four times in the superimposed manner match each other. As a result, the dot density in the state in which the background divided image W31 is printed four times in the superimposed manner matches the dot density 300 dpi×1200 dpi when the background divided image W31 is printed one time, and is lower than the dot density of the undivided background image W11 (refer to FIG. 4).

Actions and Effects of Second Working Example

The CPU 110 creates the divided print data D31 from the background divided image W31 only, of the background divided images W31 to W33 into which the background image W11 is divided. In this case, the time is not required to create the divided print data D32 and D33 from the background divided images W32 and W33. Thus, the print device 600 can shorten a time for creating the print data necessary for the printing, and can thus shorten the printing time more than in the first working example.

By printing the background divided image W31 four times in the superimposed manner, the CPU 110 can perform the printing at the same ink amount ratio of 400% as the undivided background image W11. In other words, the amount of the white ink used in the printing does not change between the case in which the background image W11 is printed, and the case in which the background divided image W31 is printed four times in the superimposed manner. Thus, the print device 600 can print the background divided image W31 in the superimposed manner under substantially the same color development conditions as the background image W11, while shortening the printing time.

The CPU 110 only divides the background image W11 to print the background divided image W31, and does not divide the color image C21. When the print image is divided and only one or some of the divided images thereof are printed, a degree of deterioration of the picture quality is smaller when the background image is divided than when the color image is divided. Therefore, compared to a case in which one or some of the divided images obtained by dividing the color image C21 are printed, the print device 600 can reduce a possibility of the deterioration in the picture quality of the print image.

In the second working example, the CPU 110 may print the background divided image W32 or the background divided image W33 in the superimposed manner. The CPU 110 may print any two of the background divided images W31 to W33 in the superimposed manner. In order to cause the ink amount ratio after the printing to match the background image W11, the CPU 110 may print the background divided image W33 two times in the superimposed manner.

The CPU 110 may set the ink amount ratio and the dot density of the background divided image W31 to an even smaller value (an ink amount ratio of 50% or the like, for example). In this case, the creation of the divided print data D31 can be further speeded up.

The CPU 110 may print the background divided image W31 two times in the superimposed manner. In this case, the print device 600 can further reduce the number of the background divided images W31 to be printed in the superimposed manner, and can thus further shorten the printing time. Note that, since the ink amount ratio of the background divided image W31 is 100%, the ink amount ratio when the background divided image W31 is printed two times in the superimposed manner is 200% (100%+100%), and thus, the ink amount ratio is smaller than that of the undivided background image W11 (refer to FIG. 4). Further, respective positions of the dots of the background divided image W31 printed two times in the superimposed manner match each other. As a result, the dot density in the state in which the background divided image W31 is printed two times in the superimposed manner matches the dot density 300 dpi×1200 dpi when the background divided image W31 is printed one time, and is lower than the dot density of the undivided background image W11 (refer to FIG. 4).

Note that, depending on the type of the recording medium, there is a case in which it is acceptable for the ink amount ratio after the printing of the background divided image W31 to be smaller than the ink amount ratio of the original background image W11. For example, when lace or the like that is formed of a thin fabric is used as the recording medium, compared to when a cotton material for a T-shirt is used as the recording medium, a smaller ink amount does not overflow and may result in beautiful color development. Therefore, the print processing that prints the background divided image W31 two times in the superimposed manner is particularly effective when performing the printing on a thin fabric.

The CPU 110 may print the background divided image W31 five times in the superimposed manner. Note that, since the ink amount ratio of the background divided image W31 is 100%, when the background divided image W31 is printed five times in the superimposed manner, a state is obtained in which the ink amount ratio is 500% (100%+100%+100%+100%+100%), and becomes larger than the ink amount ratio of the undivided background image W11 (refer to FIG. 4). In other words, by increasing the number of times that the background divided image W31 is printed in the superimposed manner, the CPU 110 can perform the printing using the ink amount ratio that is larger than that of the undivided background image W11. Thus, the CPU 110 can print the background divided image W31 in the superimposed manner under more favorable color development conditions than for the background image W11. Note that the CPU 110 performs the printing using only the divided print data D31 created from the background divided image W31, which is one of all the background divided images into which the background image W11 is divided. Thus, compared to a case in which the CPU 110 creates the divided print data from all of the background divided images into which the background image W11 is divided and performs the printing, the CPU 110 can shorten the time required to create the print data and can thus shorten the printing time. Note that when the above-described "ink amount ratio" is reworded as a higher order concept of "resolution", even when the CPU 110 creates the print data having the greater resolution than the resolution of the background image W11, the CPU 110 can shorten the creation time of the print data. Note that respective positions of the dots of the background divided image W31 printed five times in the superimposed manner match each other. As a result, the dot density in the state in which the background divided image W31 is printed five times in the superimposed manner matches the dot density 300 dpi×1200 dpi when the background divided image W31 is printed one time, and is lower than the dot density of the undivided background image W11 (refer to FIG. 4).

Note that, depending on the type of the recording medium, there is a case in which a greater ink amount ratio after the printing of the background divided image W31 than that of the original background image W11 is necessary. For example, when using a material such as a thick fabric for a hooded sweatshirt or the like, or polyester or the like, as the recording medium, compared to when using the cotton for the T-shirt as the recording medium, with a greater ink amount, the ink may remain on the surface and result in the beautiful color development. Thus, the print processing that prints the background divided image W31 five times in the superimposed manner is particularly effective when performing the printing on the thick fabric or on polyester.

THIRD WORKING EXAMPLE

A third working example, which is an example of the first processing (step S19, step S23, refer to FIG. 5) will be explained with reference to FIG. 10. The third working example differs from the second working example in that print data is created that prints at least one of the background divided images W21 to W24 into which the background image W11 is divided, in the superimposed manner. Further, the third working example differs from the second processing in that the print data is created that prints the background divided images W21 to W24 in a different order to that of the second processing. Hereinafter, a description of processing that is the same as that of the second processing, the first working example, and the second working example will be simplified.

First, in the first creation processing (step S19, refer to FIG. 5), in a similar manner to the second processing (refer to FIG. 7), the CPU 110 divides the background image W11 into the background divided images W21 to W24 each having the ink amount ratio of 100%. The CPU 110 creates the divided print data D21 to D24 (refer to steps (A) to (D) of FIG. 7) that prints the background divided images W21 to W24. Note that the divided print data D21 to D24 used in the printing is an example of the "print data" of the present disclosure. Further, the CPU 110 creates the print data D25 (refer to step (E) of FIG. 7) that prints the color image C21. Furthermore, the CPU 110 acquires, from the non-volatile storage device 130, the order information indicating the order of printing on the basis of the created divided print data D21 to D24 and the created print data D25. In the third working example, in the order information, it is assumed that the divided print data D21 is set to be first, fifth, and sixth in the printing order, the divided print data D22 is set to be second in the printing order, the divided print data D23 is set to be third in the printing order, the divided print data D24 is set to be fourth in the printing order, and the print data D25 is set to be seventh in the printing order. The CPU 110 sets the printing order for the divided print data D21 to D24 and the print data D25. Furthermore, the CPU 110 sets the standby time acquired in the processing at step S15 of the control processing (refer to FIG. 5) in the print data D25.

Next, the CPU 110 controls the printing mechanism 200 in the following manner on the basis of the created divided print data D21 to D24 and the created print data D25, and performs the first print processing (step S23, refer to FIG. 5). First, as shown in step (A) of FIG. 10, the CPU 110 discharges the white ink from the discharge heads 35 on the basis of the divided print data D21 that is first in the printing order, and prints the background divided image W21 by forming the dot row on the 4L+1-th row. Next, as shown in step (B) of FIG. 10, the CPU 110 discharges the white ink from the discharge heads 35 on the basis of the divided print data D23 that is second in the printing order, and prints the background divided image W23 by forming the dot row on the 4L+3-th row. Note that, the 4L+1-th row formed when printing the background divided image W21, and the 4L+3-th row formed when printing the background divided image W23 are separated from each other by an interval corresponding to one dot row, and the 4L+1-th row and the 4L+3-th row are not adjacent to each other in the sub-scanning direction.

Figure 10:
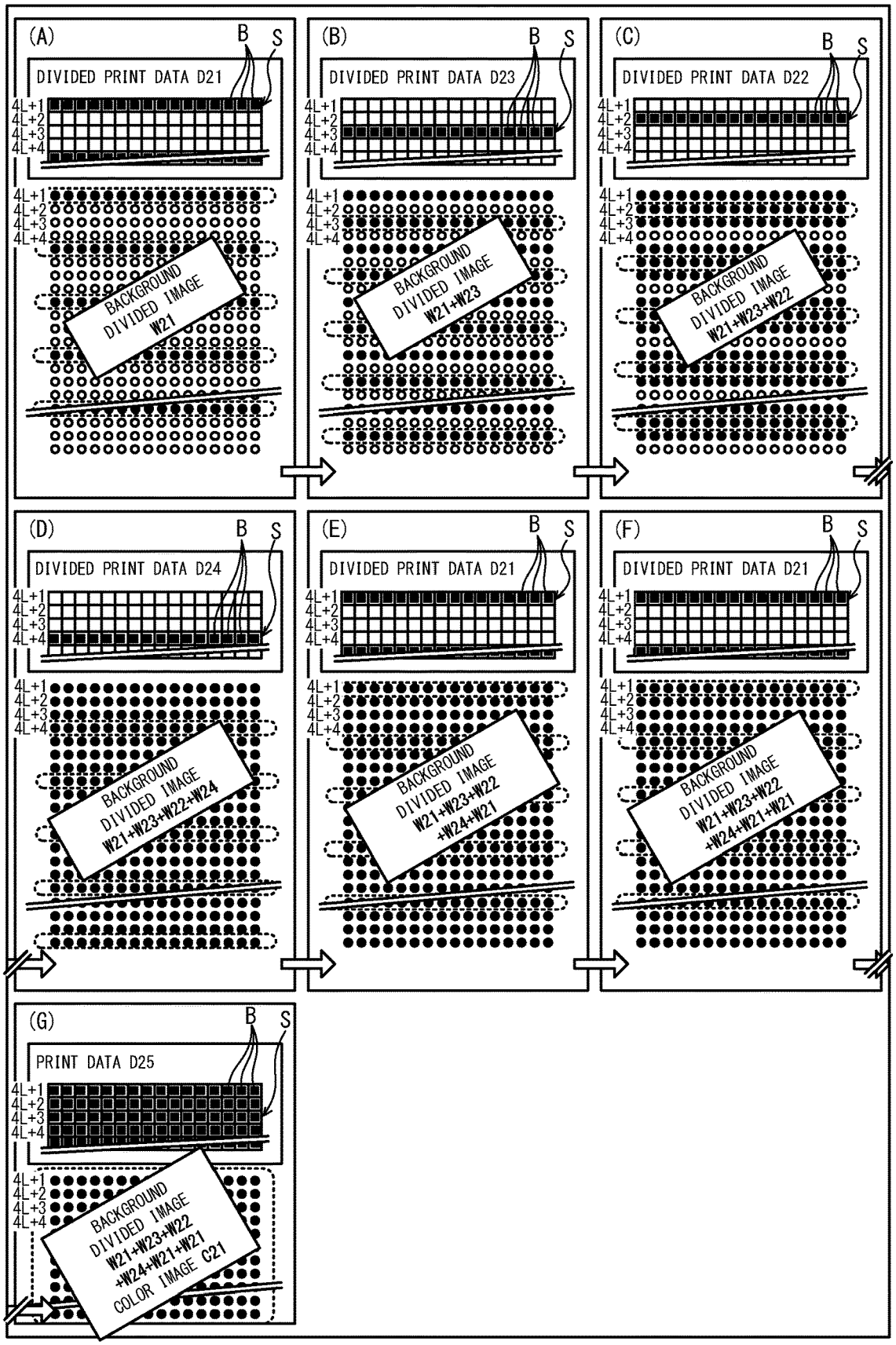
FIG. 10 is an explanatory diagram of a third working example.

Next, as shown in step (C) of FIG. 10, the CPU 110 discharges the white ink from the discharge heads 35 on the basis of the divided print data D22 that is third in the printing order, and prints the background divided image W22 by forming the dot row on the 4L+2-th row. Next, as shown in step (D) of FIG. 10, the CPU 110 discharges the white ink from the discharge heads 35 on the basis of the divided print data D24 that is fourth in the printing order, and prints the background divided image W24 by forming the dot row on the 4L+4-th row. Note that, the 4L+2-th row formed when printing the background divided image W22, and the 4L+4-th row formed when printing the background divided image W24 are separated from each other by an interval corresponding to one dot row, and the 4L+2-th row and the 4L+4-th row are not adjacent to each other in the sub-scanning direction.

Furthermore, as shown in steps (E) and (F) of FIG. 10, the CPU 110 repeats, twice, an operation to discharge the white ink from the discharge heads 35 on the basis of the divided print data D21 that is fifth and sixth in the printing order, and forms the dot row twice, in a superimposed manner, on the 4L+1-th row. As a result, the background divided images W21, W23, W22, W24, W21, and W21 are printed in that order. A state is obtained in which the background divided image W21 is printed on the recording medium three times in the superimposed manner. Next, after the printing of the final background divided image W21 is complete, the CPU 110 stands by for an amount of time corresponding to the standby time set in the print data D25. After that, as shown in step (G) of FIG. 10, the CPU 110 further prints the color image C21 on the recording medium so as to be superimposed on the printed background divided images W21, W23, W22, W24, W21, and W21.

Note that the ink amount ratio of each of the background divided images W21 to W24 is 100%. Thus, the ink amount ratio in a state in which the background divided images W21, W23, W22, W24, W21, and W21 are printed is 600% (100%+100%+100%+100%+100%+100%), and becomes larger than the ink amount ratio of the undivided background image W11 (refer to FIG. 4). On the other hand, respective positions of the dots of the printed background divided images W21 to W24 are different from each other. As a result, the dot density in the state in which the background divided images W21 to W24 are printed is the same as the dot density 1200 dpi×1200 dpi of the undivided background image W11 (refer to FIG. 4).

Actions and Effects of Third Working Example

After firstly printing the background divided image W21, the CPU 110 secondly prints the background divided image W23 that is not adjacent to the background divided image W21 in the sub-scanning direction. Further, after thirdly printing the background divided image W22, the CPU 110 fourthly prints the background divided image W24 that is not adjacent to the background divided image W22 in the sub-scanning direction. In other words, the print device 600 sets the order of printing the background divided images W21 to W24 such that the two adjacent background divided images W21 and W22 are not consecutively printed, and the two adjacent background divided images W23 and W24 are not consecutively printed. Thus, when the two adjacent dot rows are printed, the print device 600 can reduce contact and bleeding between the ink forming each of the dot rows.

By printing the background divided image W21 in the superimposed manner, the CPU 110 can perform the printing with the ink amount ratio of 600% that is greater than that of the undivided background image W11. Thus, the print device 600 can perform the printing at a higher ink amount ratio than the background image W11. As a result, the print device 600 can print the background divided images W21 to W24 under the more favorable color development conditions than the background image W11. Note that the CPU 110 can perform the printing repeatedly using the divided print data D21 created from the background divided image W21 that is one of all of the background divided images W21 to W24 into which the background image W11 is divided, and thus, it is not necessary to repeatedly create the divided print data D21. Thus, compared to a case in which the divided print data is individually created in order to perform the superimposed printing, the time required to create the print data can be shortened, and thus, the printing time can be shortened.

In the third working example, the CPU 110 may perform the printing in the order of the background divided images W21, W24, W22, W23, W21, and W21. In this case also the consecutively printed background divided images W21 and W24 are not adjacent to each other, and the consecutively printed background divided images W24 and W22 are not adjacent to each other. The background divided image that is printed in the superimposed manner after printing the background divided images W21 to W24 is not limited to the background divided image W21, and may be any of the background divided images W22 to W24. After the printing of the background divided images w21 to W24, any two or more of the background divided images W21 to W24 may be printed, one each time, in the superimposed manner.

In the third working example, the CPU 110 may divide the background image W11 into the plurality of background divided images having the different ink amount ratios, and may create the print data from each of the background divided images. On the basis of the created print data, the CPU 110 may perform the print processing such that, of the plurality of background divided images having the different ink amount ratios, the two background divided images that are adjacent to each other are not consecutively printed.

FOURTH WORKING EXAMPLE

A fourth working example, which is an example of the first processing (step S19, step S23, refer to FIG. 5) will be explained with reference to FIG. 11. The fourth working example differs from the first working example (refer to FIG. 8) in that print data is created that prints the color image C21 at the same time that the background divided image W33 is printed. Hereinafter, points that are different from the first working example will be explained in detail, and other points of explanation will be simplified.

Figure 11:
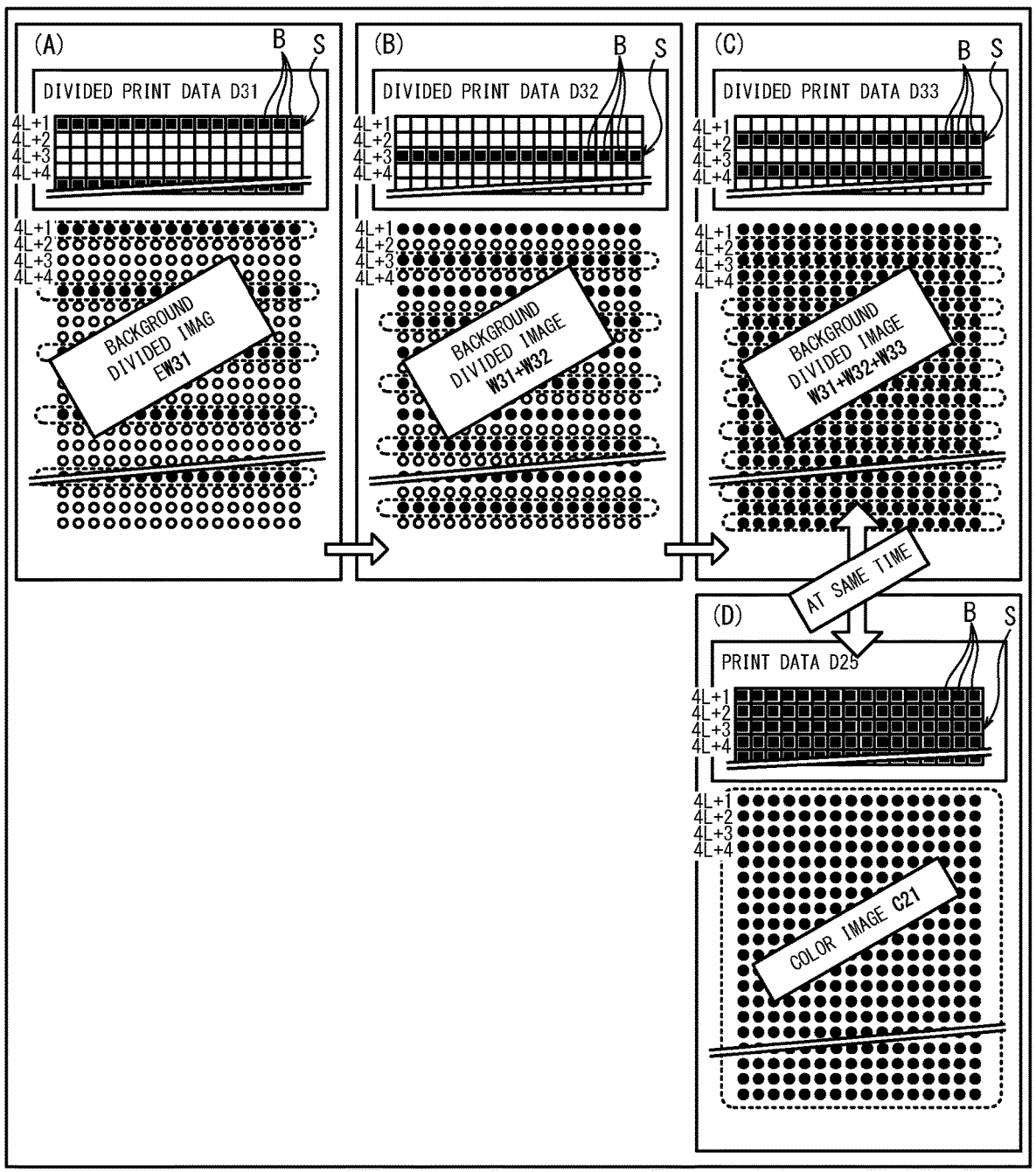
FIG. 11 is an explanatory diagram of a fourth working example.

In the first creation processing (step S19, refer to FIG. 5), the CPU 110 creates the divided print data D31 to D33 (refer to steps (A) to (C) of FIG. 11) from the background divided images W31 to W33. Further, the CPU 110 creates the print data D25 (refer to step (D) of FIG. 11) that prints the color image C21. Note that the divided print data D31 to D33 and the print data D25 used in the printing are an example of the "print data" of the present disclosure. Furthermore, the CPU 110 acquires, from the non-volatile storage device 130, the order information indicating the order when performing the printing on the basis of the created divided print data D31 to D33 and the created print data D25. Note that, in the fourth working example, in order to print the background divided image W33 and the color image C21 at the same time, in the order information, it is assumed that the divided print data D31 is set to be first in the printing order, the divided print data D32 is set to be second in the printing order, and the divided print data D33 and the print data D25 are set to be third in the printing order. The CPU 110 sets the printing order for the divided print data D31 to D33 and the print data D25.

Next, the CPU 110 controls the printing mechanism 200 on the basis of the created divided print data D31 to D33 and the created print data D25, and performs the first print processing (step S23, refer to FIG. 5). In the first print processing, the CPU 110 discharges the white ink from the discharge heads 35 on the basis of the divided print data D31 that is first in the printing order. Next, the CPU 110 discharges the white ink from the discharge heads 35 on the basis of the divided print data D32 that is second in the printing order. As a result, as shown in steps (A) and (B) of FIG. 11, the background divided images W31 and W32 are printed in that order on the recording medium.

Next, the CPU 110 discharges the white ink from the discharge heads 35 on the basis of the divided print data D33 that is third in the printing order, and at the same time, discharges the color inks from the discharge heads 35 on the basis of the print data D25 that is third in the printing order. At this time, the CPU 110 uses the print data D25 to which the offset amount is applied that is required when performing the printing of the color image in the superimposed manner on the background image. In this way, the CPU 110 prints the background divided image W33 and the color image C21 on the recording medium in the superimposed manner.

Actions and Effects of Fourth Working Example

The CPU 110 prints the background divided image W33, which is one of the background divided images W31 to W33 into which the background image W11 is divided, and the color image C21 at the same time. In this case, compared to a case in which the background divided image W33 and the color image C21 are printed at separate timings, as in the first working example (refer to FIG. 8), the print device 600 can shorten the printing time for printing the background divided images W31 to W33 and the color image C21.

In the fourth working example, the plurality of background divided images into which the background image W11 is equally divided may be respectively printed, and after that, one or some of the plurality of background images may be printed at the same time as the color image C21.

Figure 12:
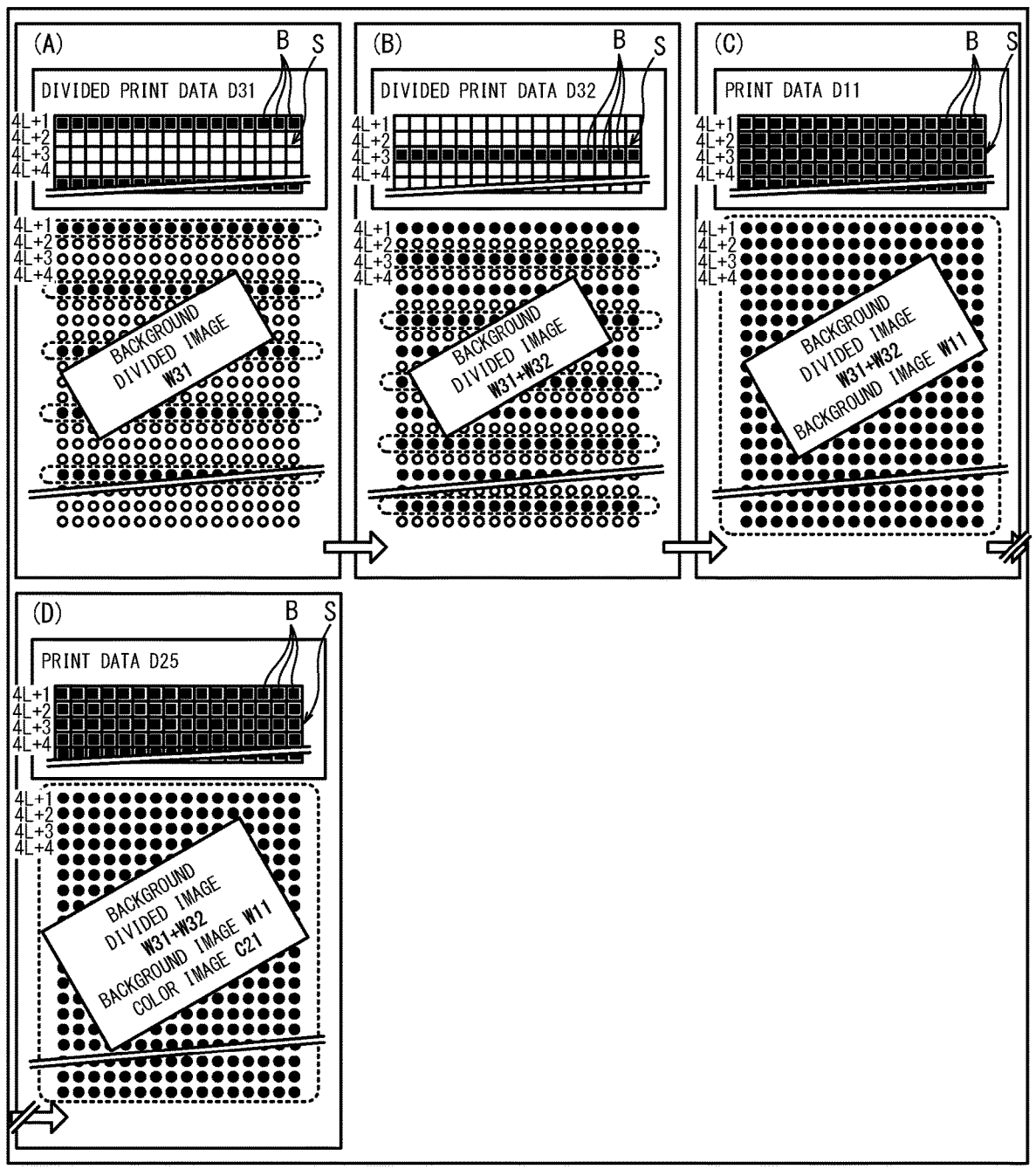
FIG. 12 is an explanatory diagram of a first modified example of the fourth working example.

In the fourth working example, the CPU 110 may set the standby time acquired in the processing at step S15 of the control processing (refer to FIG. 5) in the print data D25. Further, as shown in FIG. 12, the CPU 110 may create the print data D11 that prints the background image W11, in place of the background divided image W33. Note that the divided print data D31 and D32, and the print data D11 and D25 used in the printing are an example of the "print data" of the present disclosure. Hereinafter, a first modified example of the fourth working example will be explained with reference to FIG. 12.

As shown in FIG. 12, the CPU 110 discharges the white ink from the discharge heads 35 on the basis of the divided print data D31 and D32, and, as shown in steps (A) and (B) of FIG. 12, prints the background divided images W31 and W32 in that order on the recording medium. Next, the CPU 110 discharges the white ink from the discharge heads 35 on the basis of the print data D11, and, as shown in step (C) of FIG. 12, prints the background image W11 on the recording medium so as to be superimposed on the background divided images W31 and W32. After the standby time has elapsed from the end of the printing of the background image W11, the CPU 110 discharges the color inks from the discharge heads 35 on the basis of the print data D25. As a result, as shown in step (D) of FIG. 12, the color image C21 is printed on the recording medium so as to be superimposed on the background divided images W31 to W33.

As described above, in the first modified example, the CPU 110 starts the printing of the color image C21 after the standby time has elapsed from the end of the printing of the background image W11. In this case, the print device 600 can discharge the color inks of the color image C21 after drying the white ink of the background image W11 during the standby time. Thus, the print device 600 can suppress the color inks of the color image C21 to be printed in the superimposed manner on the background image W11 from being superimposed on and bleeding into the white ink of the background image W11 that is not dry.

A standby time may be set for a period from when the printing of the background divided image W31 is ended to when the printing of the background divided image W32 starts, and for a period from when the printing of the background divided image W32 is ended to when the printing of the background image W11 starts. In this case, the print device 600 can suppress the possibility that the white ink will be superimposed and will bleed through.

Note that, in FIG. 12, the standby time need not necessarily be set, and, as in the fourth working example, for example, the background image W11 and the color image C21 may be printed at the same time. In other words, the background image W11 that is not divided, and the color image C21 that is not divided may be printed at the same time. In this case, compared to a case in which the background divided images into which the background image W11 is divided, and the color image C21 that is not divided are printed at the same time, the printing of the background divided images having the high ink amount ratios and the color image can be performed in a short time. Thus, the print device 600 can discharge the white ink efficiently in a short time, and print the background image.

In the first modified example, divided print data may be created by dividing the color image C21. Hereinafter, a second modified example of the fourth working example will be explained with reference to FIG. 13.

Figure 13:
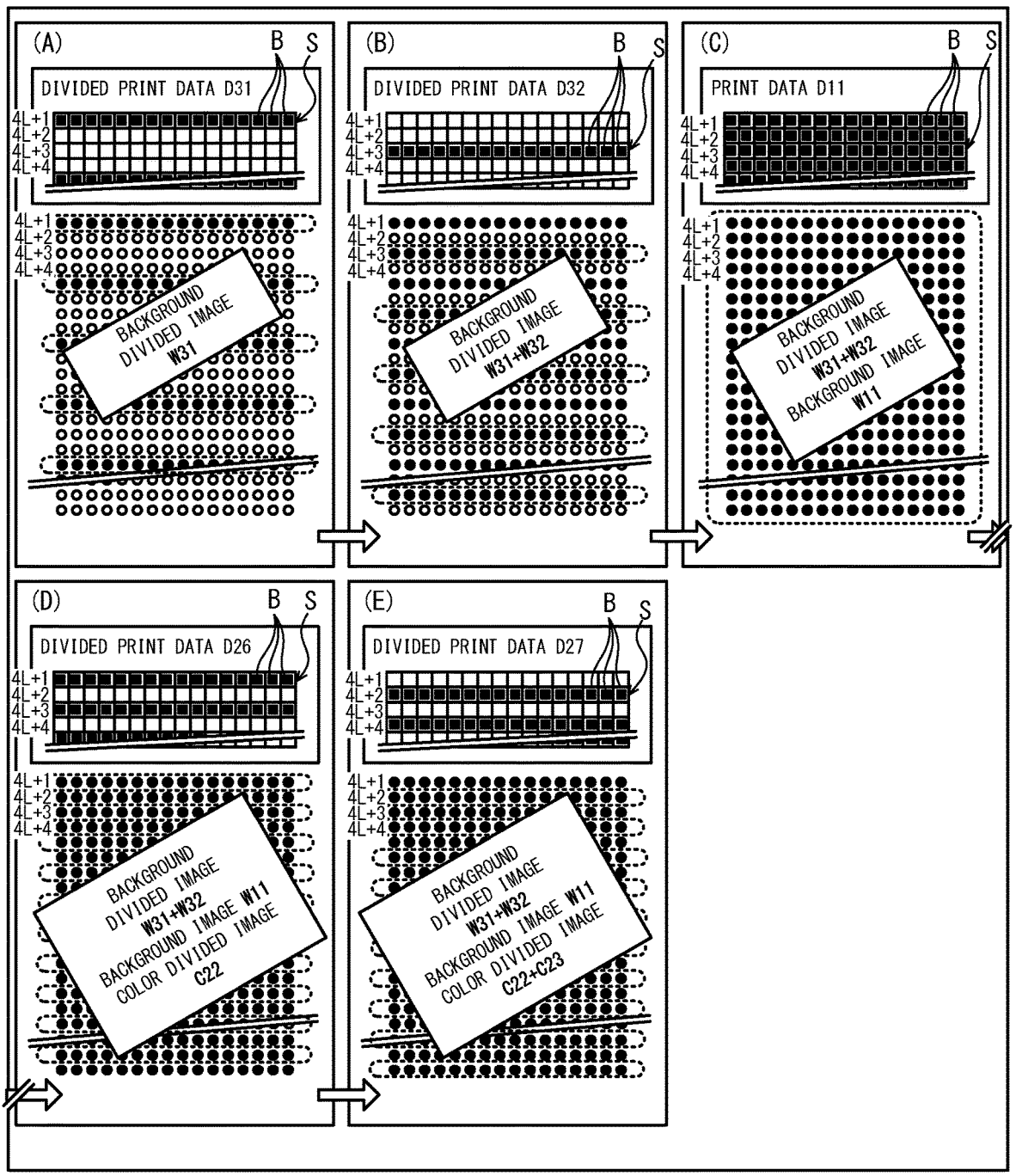
FIG. 13 is an explanatory diagram of a second modified example of the fourth working example.

As shown in FIG. 13, the CPU 110 divides the color image C21 into a color divided image C22 (refer to step (D) of FIG. 13) having an ink amount ratio of 200%, and a color divided image C23 (refer to step (E) of FIG. 13) having an ink amount ratio of 200%. In the color divided image C22, color ink dot rows are formed on the 4L+1-th row and the 4L+3-th row. In the color divided image C23, color ink dot rows are formed on the 4L+2-th row and the 4L+4-th row. The dot density of each of the color divided images C22 and C23 is 600 dpi×1200 dpi.

As shown in step (D) of FIG. 13, the CPU 110 creates divided print data D26 from the color divided image C22. As shown in step (E) of FIG. 13, the CPU 110 creates divided print data D27 from the color divided image C23. Note that the divided print data D31 and D32, the print data D11, and the divided print data D26 and D27 used in the printing are an example of the "print data" of the present disclosure. The CPU 110 acquires, from the non-volatile storage device 130, the order information indicating the order when performing the printing on the basis of the created divided print data D31 and D32, the created print data D11, and the created divided print data D26 and D27. In the second modified example, in the printing order, it is assumed that the divided print data D31 is set to be first in the printing order, the divided print data D32 is set to be second in the printing order, the print data D11 is set to be third in the printing order, the divided print data D26 is set to be fourth in the printing order, and the divided print data D27 is set to be fifth in the printing order. The CPU 110 sets the printing order for the divided print data D31 and D33, the print data D11, and the divided print data D26 and D27. Furthermore, the CPU 110 sets the standby time acquired in the processing at step S15 of the control processing (refer to FIG. 5) in the divided print data D26.

Next, the CPU 110 controls the printing mechanism 200 on the basis of the created divided print data D31 and D32, the created print data D11, and the created divided print data D26 and D27, and performs the first print processing (step S23, refer to FIG. 5). In the first print processing, the CPU 110 discharges the white ink from the discharge heads 35 on the basis of the divided print data D31 and D32, and, as shown in steps (A) and (B) of FIG. 13, prints the background divided images W31 and W32 in that order on the recording medium. Next, the CPU 110 discharges the white ink from the discharge heads 35 on the basis of the print data D11, and, as shown in step (C) of FIG. 13, prints the background image W11 on the recording medium so as to be superimposed on the background divided images W31 and W32. Next, after the printing of the background image W11 is complete, the CPU 110 stands by for an amount of time corresponding to the standby time set in the print data D26. After that, the CPU 110 discharges the color inks from the discharge heads 35 on the basis of the divided print data D26 and D27, and prints the color divided images C22 and C23 on the recording medium, as shown in steps (D) and (E) of FIG. 13.

Note that the ink amount ratio of each of the color divided images C22 and C23 is 200%, and thus, the ink amount ratio in the state in which the color divided images C22 and C23 are printed is 400% (200%+200%), and matches that of the undivided color image C21. Further, the dot density of the printed color divided images C22 and C23 is the same as the dot density of the undivided color image C21, namely, 1200 dpi×1200 dpi.

As described above, in the second modified example, the print device 600 divides the background image W11 into the background divided images W31 and W32 and performs the printing, and divides the color image C21 into the color divided images C22 and 23 and performs the printing. Note that, by printing all of the color divided images C22 and C23 into which the color image C21 is divided, the print device 600 reproduces the ink amount ratio and the dot density of the color image C21. Thus, the print device 600 can suppress the deterioration in picture quality even when dividing the color image C21 and performing the printing.

Note that, in the second modified example, after printing the background divided images W31 and W32, the CPU 110 may create print data that prints the color divided images C22 and C23 without printing the background image W11. The ink amount ratio and the dot density of each of the color divided images into which the color image C21 is divided are not limited to those of the second working example. For example, the CPU 110 may divide the color image C21 into a plurality of the color divided images having differing ink amount ratios and dot densities, and may create the divided print data. Further, for example, the CPU 110 may create the divided print data in which, when the divided plurality of color divided images are printed, the ink amount ratio and the dot density are different from the ink amount ratio and the dot density of the color image C21.

In the second modified example, print data may be created that prints the background divided image W33 in place of the background image W11. Hereinafter, a third modified example of the fourth working example will be explained with reference to FIG. 14.

Figure 14:
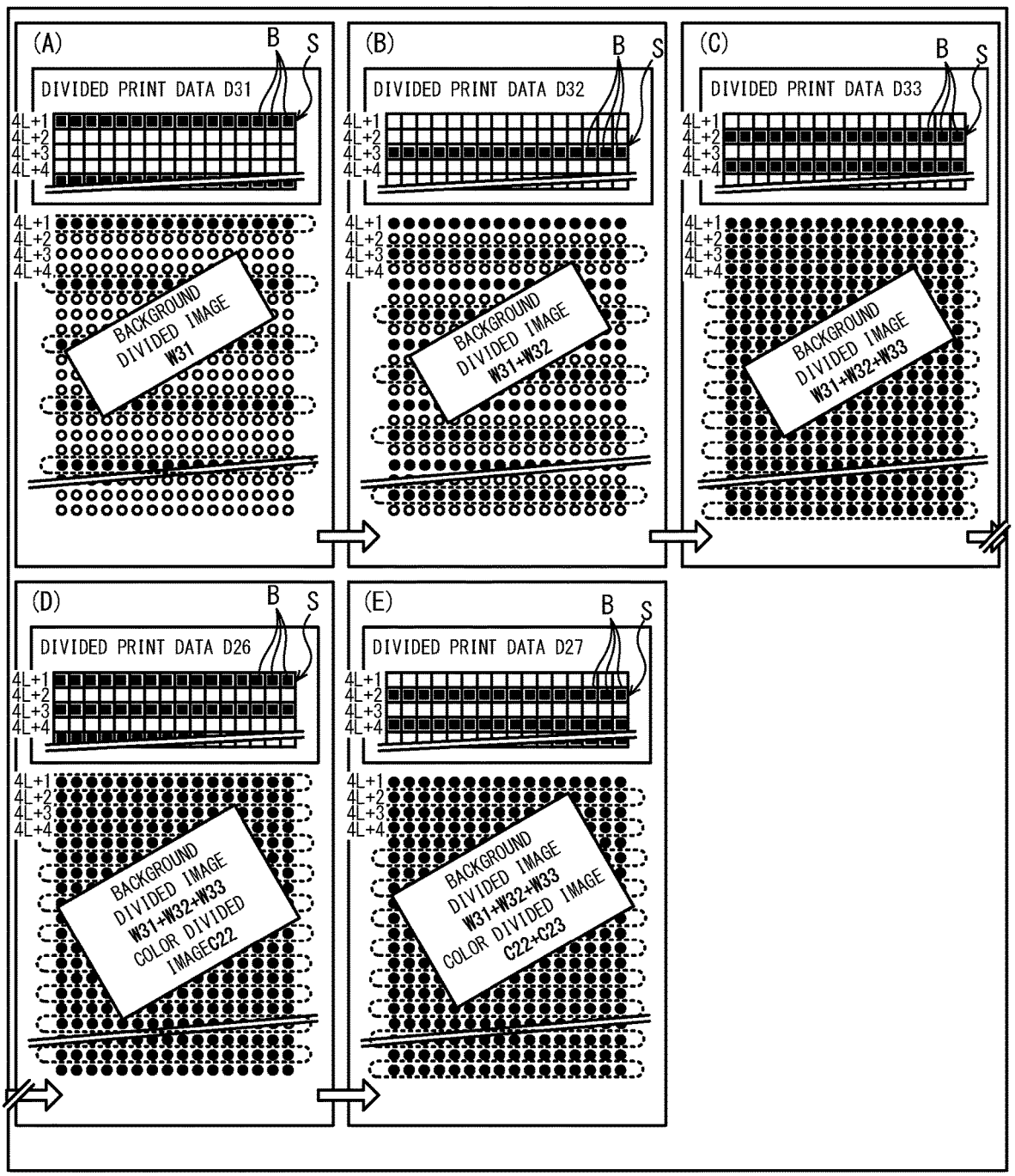
FIG. 14 is an explanatory diagram of a third modified example of the fourth working example.

As shown in FIG. 14, the CPU 110 creates the divided print data D31 to D33 (refer to steps (A) to (C) of FIG. 14) from the background divided images W31 to W33. Further, the CPU 110 creates the divided print data D26 and D27 (refer to steps (D) and (E) of FIG. 14) from the color divided images C22 and C23. Note that the divided print data D31 to D33, D26, and D27 used in the printing are an example of the "print data" of the present disclosure. The CPU 110 acquires, from the non-volatile storage device 130, the order information indicating the order when performing the printing on the basis of the created divided print data D31 to D33, D26, and D27. In the third modified example, in the order information, it is assumed that the divided print data D31 is set to be first in the printing order, the divided print data D32 is set to be second in the printing order, the divided print data D33 is set to be third in the printing order, the divided print data D26 is set to be fourth in the printing order, and the print data D27 is set to be fifth in the printing order. The CPU 110 sets the printing order for the divided print data D31 to D33, D26, and D27. Furthermore, the CPU 110 sets the standby time acquired in the processing at step S15 of the control processing (refer to FIG. 5) in the divided print data D26.

Next, the CPU 110 controls the printing mechanism 200 on the basis of the created divided print data D31 to D33, D26, and D27, and performs the first print processing (step S23, refer to FIG. 5). In the first print processing, the CPU 110 discharges the white ink from the discharge heads 35 on the basis of the divided print data D31 to D33, and, as shown in steps (A) to (C) of FIG. 14, prints the background divided images W31 to W33 in order on the recording medium. Next, after the printing of the background divided image W33 is complete, the CPU 110 stands by for an amount of time corresponding to the standby time set in the print data D26. After that, the CPU 110 discharges the color ink from the discharge heads 35 on the basis of the print data D26 and D27, and, as shown in steps (D) and (E) of FIG. 14, prints the color divided images C22 and C23 on the recording medium.

As described above, in the third modified example, the number (3) of the background divided images W21 to W23 into which the background image W11 is divided is larger than the number (2) of the color divided images C22 and C23 into which the color image C21 is divided. In this way, by causing the number into which the background image W11 is divided to be relatively large compared to the number into which the color image C21 is divided, the print device 600 can reduce a possibility that each of the dots of the background divided images W21 to S23, in particular, partially overlap at the time of printing. Thus, the print device 600 can suppress bleeding of the background image W11.

In the third modified example, the CPU 110 may print the color image C23 that is divided into two equal sections after printing each of the background divided images obtained by dividing the background image W11 into four equal sections.

OTHER MODIFIED EXAMPLES

The present disclosure is not limited to the above-described embodiments, and various modification are possible. The print data creation program is not limited to being executed by the CPU 110 of the print device 600. For example, the print data creation program may executed by a CPU of a PC, a server, or the like (hereinafter referred to as a control terminal) connected to the print device 600. In this case, the print data created by executing the print data creation program may be output from the control terminal to the print device 600. The print device 600 may perform the print processing on the basis of the print data output from the control terminal.

A base coat agent that is applied before the ink is discharged onto the recording medium may be discharged in place of the white ink. The print command received from the operation portion 150 may include a command specifying one of the first working example to the fourth working example, or the first modified example to the third modified example. The CPU 110 may create the print data and perform the print processing on the basis of the specified one of the second processing, first working example to fourth working example, or first modified example to third modified example.

The CPU 110 may set an upper limit for the ink amount ratio and the dot density of the background divided images into which the background image W11 is divided. The CPU 110 may create the background divided images having the ink amount ratio and the dot density determined freely within a range that does not exceed the set upper limit. The ink amount ratio and dot density determined at this time may be, for example, determined on the basis of a random number table stored in the non-volatile storage device 130 in advance.

The user may input, via the operation portion 150, a print command that, in accordance with the type of the recording medium, specifies which one of the second processing, the first working example, or the first modified example to the third modified example is to be performed. The CPU 110 may acquire the print command specifying which of the second processing, the first working example to the fourth working example, or the first modified example to the third modified example is to be performed, and may create the print data and perform the print processing on the basis of the corresponding working example. At this time, the ink amount ratio and the dot density of the background divided images may be determined such that the ink amount ratio and the dot density of the background images set for each of the second processing, the first working example to the fourth working example, and the first modified example to the third modified example do not fall below a lower limit. In this way, when the recording medium is cleaned, the print device 600 can suppress cracking or peeling of the printed white ink.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions, the instructions, when executed by a computer, causing the computer to perform processes comprising:
   an acquisition step of acquiring, from a storage, image data representing a print image; and
   a first creation step of dividing the print image represented by the image data acquired by the acquisition step into a plurality of divided images of a desired resolution, and creating print data to print an entirety of the print image, from one of the plurality of divided images, not to print the entirety of the print image from all of the plurality of divided images, the print image being to be printed by a print device.

2. The non-transitory computer-readable medium storing the computer-readable instructions according to claim 1, wherein
   in the first creation step, the instructions cause the computer to perform one of
      dividing the print image represented by the image data acquired by the acquisition step into the plurality of divided images while causing a resolution of at least one of the divided images to be higher than a resolution of the other divided images, and creating the print data to print an entirety of the print image from the one of the plurality of the divided images, not to print the entirety of the print image from all of the plurality of divided images, the print image being to be printed by the print device, and
      dividing the print image represented by the image data acquired by the acquisition step using a desired resolution, and creating the print data to print an entirety of the print image from the one of the divided plurality of divided images, not to print the entirety of the print image from all of the plurality of divided images, the print image being to be printed by the print device.

3. The non-transitory computer-readable medium storing computer-readable instructions according to claim 2, wherein
   in the first creation step, the instructions cause the computer to divide the print image into n divided images (n is an integer smaller than N) having a resolution D/N obtained by dividing a resolution D of the print image by N (N is an integer), and m print divided images having a resolution of $(D-(D \times n/N))/m$ (m is an integer smaller than N−n).

4. The non-transitory computer-readable medium storing computer-readable instructions according to claim 1, wherein in the first creation step, the instructions cause the computer to divide the print image into the plurality of divided images of a desired resolution, and create the print data to print of the one of the plurality of the divided images in a superimposed manner.

5. The non-transitory computer-readable medium storing computer-readable instructions according to claim 1, wherein in the first creation step, the instructions cause the computer to create the print data in which an order is set for printing each of the plurality of divided images in a manner where, of the plurality of divided images, at least some of two adjacent divided images are not printed consecutively.

6. The non-transitory computer-readable medium storing computer-readable instructions according to claim 1, wherein in the acquisition step, the instructions cause the computer to acquire the image data of the print image representing a background image to be used as a background of a color image.

7. The non-transitory computer-readable medium storing computer-readable instructions according to claim 6, wherein in the first creation step, the instructions cause the computer to create the print data to print the one of the plurality of divided images into which the background image is divided at the same time as the color image.

8. The non-transitory computer-readable medium storing computer-readable instructions according to claim 6, wherein in the first creation step, the instructions cause the computer to create the print data to print the undivided background image and the undivided color image after printing the one of the plurality of divided images into which the background image is divided.

9. The non-transitory computer-readable medium storing computer-readable instructions according to claim 6, wherein in the acquisition step, the instructions cause the computer to acquire a standby time, the standby time being a time from after printing the plurality of divided images into which the background image is divided to when printing the color image, and in the first creation step, the instructions cause the computer to create the print data to print the color image after the standby time acquired in the acquisition step elapses from after the printing of the plurality of divided images.

10. The non-transitory computer-readable medium storing computer-readable instructions according to claim 1, wherein in the acquisition step, the instructions cause the computer to acquire a color image and the image data of the print image representing a background image to be used as a background to the color image, and in the first creation step, the instructions cause the computer to divide the background image into a plurality of background divided images of a desired resolution and divide the color image into a plurality of color divided images of a desired resolution, and create the print data for the print device to print the one of the plurality of background divided images and for the print device to print all of the plurality of color divided images.

11. The non-transitory computer-readable medium storing computer-readable instructions according to claim 1, wherein in the acquisition step, the instructions cause the computer to acquire a color image, and the image data of the print image representing a background image to be used as a background to the color image, and in the first creation step, the instructions cause the computer to divide the background image into a plurality of background divided images of a desired resolution and divide the color image into a number of color divided images of a desired resolution, the number of the color divided images being smaller than a number of the plurality of background divided images.

12. The non-transitory computer-readable medium storing computer-readable instructions according to claim 1, wherein in the acquisition step, the instructions cause the computer to further acquire a print method to be used by the print device, in the first creation step, the instructions cause the computer to create the print data when a first print method is acquired by the acquisition step, and when a second print method is acquired by the acquisition step, the instructions further cause the computer to perform a second creation step of creating one of print data to be printed by the print device without dividing the print image, and print data to be printed by the print device from all of a plurality of divided images into which the print image is equally divided.

13. A print device comprising:

a processor; and a memory configured to store computer-readable instructions that, when executed by the processor, perform processes including:

acquisition processing of acquiring, from a storage, image data representing a print image, and creation processing of dividing the print image represented by the image data acquired by the acquisition processing into a plurality of divided images of a desired resolution, and creating print data to print an entirety of the print image from one of the plurality of divided images, not to print the entirety of the print image from all of the plurality of divided images, the print image being to be printed by a print device.

14. A print data creation method comprising:

an acquisition step of acquiring, from a storage, image data representing a print image, and a creation step of dividing the print image represented by the image data acquired by the acquisition step into a plurality of divided images of a desired resolution, and creating print data to print an entirety of the print image from one of the plurality of divided images, not to print the entirety of the print image from all of the plurality of divided images, the print image being to be printed by a print device.

* * * * *